(12) United States Patent
Zachariah

(10) Patent No.: US 7,801,884 B2
(45) Date of Patent: Sep. 21, 2010

(54) DATA MAPPING DOCUMENT DESIGN SYSTEM

(75) Inventor: Alex George Zachariah, Kerala (IN)

(73) Assignee: Accenture Global Services GmbH, Schaffhausen (CH)

( * ) Notice: Subject to any disclaimer, the term of this patent is extended or adjusted under 35 U.S.C. 154(b) by 331 days.

(21) Appl. No.: 11/967,455

(22) Filed: Dec. 31, 2007

(65) Prior Publication Data

US 2009/0077014 A1    Mar. 19, 2009

(30) Foreign Application Priority Data

Sep. 19, 2007   (IN) .................... 1818/MUM/2007

(51) Int. Cl.
*G06F 17/30* (2006.01)

(52) U.S. Cl. ............... 707/713; 707/706; 707/999.002; 707/999.003; 707/999.005; 707/E17.014; 707/E17.017; 707/E17.054; 707/E17.071; 707/E17.075

(58) Field of Classification Search ............. None
See application file for complete search history.

(56) References Cited

U.S. PATENT DOCUMENTS

| | | | |
|---|---|---|---|
| 5,945,985 A | 8/1999 | Babin et al. | |
| 6,374,263 B1 | 4/2002 | Bunger et al. | |
| 6,571,232 B1 | 5/2003 | Goldberg et al. | |
| 6,574,635 B2 | 6/2003 | Stauber et al. | |
| 6,609,123 B1 | 8/2003 | Cazemier et al. | |
| 6,662,188 B1 | 12/2003 | Rasmussen et al. | |
| 6,701,321 B1 | 3/2004 | Tsai | |
| 6,760,721 B1 | 7/2004 | Chasen et al. | |
| 6,765,928 B1 * | 7/2004 | Sethuram et al. | ............ 370/476 |
| 6,836,777 B2 | 12/2004 | Holle | |
| 7,222,116 B2 | 5/2007 | Bello et al. | |
| 7,406,436 B1 * | 7/2008 | Reisman | ...................... 705/10 |
| 7,430,721 B2 | 9/2008 | Johanson et al. | |
| 7,478,107 B1 | 1/2009 | Yehuda | |

(Continued)

FOREIGN PATENT DOCUMENTS

WO    WO 99/52047    10/1999

(Continued)

OTHER PUBLICATIONS

The prosecution history of U.S. Appl. No. 11/967,461 shown in the attached Patent Application Retrieval file wrapper document list, printed Jan. 12, 2009, including each substantive office action and applicant response going forward.

(Continued)

*Primary Examiner*—Don Wong
*Assistant Examiner*—Andalib F Lodhi
(74) *Attorney, Agent, or Firm*—Fish & Richardson P.C.

(57) ABSTRACT

A data mapping document design system provides a market differentiator that facilitates creating the technical specification for migrating legacy databases. The system addresses the significant technical problems associated with the immensely labor intensive, complex, and error prone endeavor of manually creating the technical specification. The system not only achieves cost and time savings in clearly measurable aspects of data migration such as migration project cost and completion timelines, but also achieves improvements in other harder to measure and track areas, such as data quality, and achieves reductions in subsequently discovered data errors.

23 Claims, 26 Drawing Sheets

U.S. PATENT DOCUMENTS

| | | | |
|---|---|---|---|
| 7,483,892 B1 * | 1/2009 | Sommer et al. | 707/5 |
| 7,574,454 B2 | 8/2009 | Lee | |
| 2004/0003396 A1 * | 1/2004 | Babu | 725/34 |
| 2004/0158567 A1 | 8/2004 | Dettinger et al. | |
| 2004/0242158 A1 | 12/2004 | Fattouch et al. | |
| 2005/0055369 A1 | 3/2005 | Gorelik et al. | |
| 2006/0026136 A1 * | 2/2006 | Drucker et al. | 707/3 |
| 2007/0055655 A1 | 3/2007 | Bernstein et al. | |
| 2007/0185913 A1 | 8/2007 | Reichert et al. | |
| 2009/0077114 A1 | 3/2009 | Zachariah | |
| 2009/0171606 A1 | 7/2009 | Murata et al. | |

FOREIGN PATENT DOCUMENTS

| | | |
|---|---|---|
| WO | WO 2004/077215 | 9/2004 |
| WO | WO 2005/013603 | 4/2005 |
| WO | WO 2005/031603 | 4/2005 |

OTHER PUBLICATIONS

S. Bossung et al., Automated Data Mapping Specification via Schema Heuristics and User Interaction, 10 pgs., Proceedings of the 19$^{th}$ International Conference on Automated Software Engineering, IEEE 2004.

L. Popa et al., Mapping XML and Relational Schemas with Clio, Proceedings of the 18$^{th}$ International Conference on Data Engineering, IEEE, 2002.

E. Rahm et al., A Survey of Approaches to Automatic Schema Matching, pp. 334-350, The VLDP Journal 10, Nov. 2001.

P. Ponniah, Data Extraction, Data Warehousing Fundamentals: A Comprehensive Guide for IT Professionals. Chapter 12 Data Extraction, Transformation, and Loading Chapter 16 Data Warehousing and the Web, pp. 257-397, Jan. 2001.

Oracle Warehouse Builder: A Technical Overview: An Oracle Technical White Paper, pp. 1-21, Feb. 2000.

Extended Search Report for corresponding EPO case 08253084.1.

Australian Office Action for Application No. 2008221522, dated Jan. 14, 2010, 2 pages.

Australian Office Action for Application No. 2008221523, dated Jan. 14, 2010, 2 pages.

Jaedicke, EPO Search Report in co-pending European Application No. 08253080.9 mailed Dec. 17, 2008, to be published by the USPTO with the file history of this application, 11 pages.

Indian First Examination Report for Application No. 1818/MUM/2007 dated Jun. 15, 2010 (2 pages).

* cited by examiner

| Applet Field | Type | Column | Join Name/Table |
| --- | --- | --- | --- |
| Account Status | Join Field | CUST_STAT_CD | S_ORG_EXT |
| Alias | Join Field | ALIAS_NAME | S_ORG_EXT |
| Name | Join Field | NAME | S_ORG_EXT |
| Organization | MVF | | |
| PG Account Name in Local Lang | Join Field | X_ACCT_NAME_LOCAL_LNG | S_ORG_EXT |
| PG Accrual Fund Eligible Flag | Join Field | X_ACCRUAL_FLG | S_ORG_EXT |
| Street Address | MVF | | |
| PG Bank Account | Join Field | ATTRIB_38 | S_ORG_EXT_XM |
| PG Channel Description | Join Field | VAL | S_LST_OF_VAL |
| PG Parent Account Alias Name | Join Field | ALIAS_NAME | Parent Account |
| PG Pay to Accounts | MVF | | |
| PG Vendor Accounts | MVF | | |
| Parent Account Name | Join Field | NAME | Parent Account |
| PG Message | Join Field | X_MESSAGE | S_ORG_EXT |
| Sales Rep | MVF | | |
| Account Type Code | Join Field | ACCNT_TYPE_CD | S_ORG_EXT |
| Currency Code | Join Field | BASE_CURCY_CD | S_ORG_EXT |
| Customer Account Group | Join Field | BO_CUST_GRP_CD | S_ORG_EXT |
| Drug Spent Currency Code | Join Field | AMT_CURCY_CD | S_ORG_EXT_LSX |
| Group Type Code | SVF | GROUP_TYPE_CD | base column |
| Internal Org Flag | Join Field | INT_ORG_FLG | S_ORG_EXT |
| Master Account Id | Join Field | MASTER_OU_ID | S_ORG_EXT |
| Party Type Code | SVF | PARTY_TYPE_CD | base column |
| Party Uid | SVF | PARTY_UID | |
| Privacy Code | Join Field | PRIVACY_CD | S_ORG_EXT |
| Type | Join Field | OU_TYPE_CD | S_ORG_EXT |

| | EIM Tables \\\\\\ | Base columns >>>> 802 GROUP_TYPE_CD | PARTY_TYPE_CD | PARTY_UID | PARTY_TYPE_CD | PARTY_UID | ROOT_PARTY_FLG |
|---|---|---|---|---|---|---|---|
| 1 | EIM_ACCDTL_TNT | | | | | | |
| 2 | EIM_ACCNT_CUT | | 1 | 1 | 1 | 1 | |
| 3 | EIM_ACCNT_DTL | | 1 | 1 | 1 | 1 | |
| 4 | EIM_ACCNT_PROF | | 1 | 1 | 1 | 1 | |
| 5 | EIM_ACCNT_UT | | 1 | 1 | 1 | 1 | |
| 6 | EIM_ACCOUNT | 1 | 1 | 1 | 1 | 1 | 1 |
| 7 | EIM_ACCOUNT1 | | 1 | 1 | 1 | 1 | |
| 8 | EIM_ACCOUNT2 | | 1 | 1 | 1 | 1 | |
| 9 | EIM_ACCOUNT3 | | 1 | 1 | 1 | 1 | |
| 10 | EIM_ACCOUNT_AT | | 1 | 1 | 1 | 1 | |
| 11 | EIM_BU | 1 | 1 | 1 | 1 | 1 | 1 |
| 12 | EIM_CONTACT | 1 | 1 | 1 | 1 | 1 | 1 |
| 13 | EIM_CONTACT1 | | 1 | 1 | 1 | 1 | |
| 14 | EIM_CONTACT2 | | 1 | 1 | 1 | 1 | |
| 15 | EIM_CONTACT3 | | 1 | 1 | 1 | 1 | |
| 16 | EIM_CONTACT_AT | | 1 | 1 | 1 | 1 | |
| 17 | EIM_CON_DTL | | 1 | 1 | 1 | 1 | |
| 18 | EIM_CON_LOY | | 1 | 1 | 1 | 1 | |
| 19 | EIM_CS_ACCNT | | 1 | 1 | 1 | 1 | |
| 20 | EIM_EMPLOYEE | 1 | 1 | 1 | 1 | 1 | 1 |

Figure 9

Table 1 (900, 902):

| | EIM Tables VV | join colums to be mapped >>>> CUST_STAT_CD | ALIAS_NAME | NAME | X_ACCT_NAME_LOCAL_LNG | X_ACCRUAL_FLG | ATTRIB_38 | VAL | X_MESSAGE |
|---|---|---|---|---|---|---|---|---|---|
| 1 | EIM_ACCDTL_TNT | | | | | | | | |
| 2 | EIM_ACCNT_CUT | | 1 | 1 | | | | | |
| 3 | EIM_ACCNT_DTL | | | 1 | | | | | |
| 4 | EIM_ACCNT_PROF | | | 1 | | | | | |
| 5 | EIM_ACCNT_UT | | | 1 | | | | | |
| 6 | EIM_ACCOUNT | | 1 | 1 | 1 | 1 | | | 1 |
| 7 | EIM_ACCOUNT1 | | | 1 | | | | | |
| 8 | EIM_ACCOUNT2 | | | 1 | | | | | |
| 9 | EIM_ACCOUNT3 | | | 1 | | | | | |
| 10 | EIM_ACCOUNT_AT | | | 1 | | | | | |
| 11 | EIM_CS_ACCNT | | | 1 | | | | | |
| 12 | EIM_FN_ACCNT1 | | 1 | 1 | | | | | |

Table 2 (904, 908):

| | EIM Tables VV | join colums to be mapped >>>> ACCNT_TYPE_CD | BASE_CURCY_CD | BO_CUST_GRP_CD | INT_ORG_FLG | MASTER_OU_ID | PRIVACY_CD | OU_TYPE_CD |
|---|---|---|---|---|---|---|---|---|
| 1 | EIM_ACCDTL_TNT | | | | | | | |
| 2 | EIM_ACCNT_CUT | 1 | 1 | | | | | |
| 3 | EIM_ACCNT_DTL | 1 | | | | | | |
| 4 | EIM_ACCNT_PROF | | | | | | | |
| 5 | EIM_ACCNT_UT | | | | | | | |
| 6 | EIM_ACCOUNT | | 1 | 1 | 1 | | 1 | 1 |
| 7 | EIM_ACCOUNT1 | | | | | | | |
| 8 | EIM_ACCOUNT2 | | | | 1 | | | 1 |
| 9 | EIM_ACCOUNT3 | | | | | | | |
| 10 | EIM_ACCOUNT_AT | | | | | | | |
| 11 | EIM_CS_ACCNT | | | | | | | |
| 12 | EIM_FN_ACCNT1 | | 1 | | | | | 1 |

Figure 9

| View Name : PG TFM AAI My Account List View | | | | |
|---|---|---|---|---|
| UI Attributes | Type | Visible | BC Field | BC Req |
| | | | | |
| Applet Name : PG TFM AAI SIS Account List Applet | | | | |
| | | | | |
| | | | | |
| Status | List Column | Y | Account Status | |
| Account | List Column | Y | Alias | |
| Account Id | List Column | Y | Name | Y |
| Organization | List Column | Y | Organization | |
| Account Name 2 | List Column | Y | PG Account Name in Local Lang | |
| Accrual Fund Eligible | List Column | Y | PG Accural Fund Eligible Flag | |
| Address | List Column | Y | Street Address | |
| Bank Account | List Column | Y | PG Bank Account | |
| Channel Description | List Column | Y | PG Channel Description | |
| Parent Account | List Column | Y | PG Parent Account Alias Name | |
| Pay to Accounts | List Column | Y | PG Pay to Accounts | |
| Vendors | List Column | Y | PG Vendor Accounts | |
| Parent Account Id | List Column | Y | Parent Account Name | |
| Price List Message | List Column | Y | PG Message | |
| Account Team | List Column | Y | Sales Rep | |
| | | | Account Type Code | Y |
| | | | Currency Code | Y |
| | | | Customer Account Group | Y |
| | | | Drug Spent Currency Code | Y |
| | | | Group Type Code | Y |
| | | | Internal Org Flag | Y |
| | | | Master Account Id | Y |
| | | | Party Type Code | Y |
| | | | Party Uid | Y |
| | | | Privacy Code | Y |
| | | | Type | Y |
| | | | | |
| | | | | |
| | | | | |

| Base Table Table Name | Base Table Column | Type | Len | Null | Def. | LOV | Comments |
|---|---|---|---|---|---|---|---|
| | | | | | | | |
| | | | | | | | |
| | | | | | | | |
| S_ORG_EXT | CUST_STAT_CD | Varchar | 30 | Y | | ACCOUNT_STATUS | Join Field[I] |
| S_ORG_EXT | ALIAS_NAME | Varchar | 100 | Y | | | Join Field[I] |
| S_ORG_EXT | NAME | Varchar | 100 | N | | | Join Field[I] |
| S_PARTY | | | | | | | MVF |
| S_ORG_EXT | X_ACCT_NAME_LOC... | Varchar | 255 | Y | | | Join Field[I] |
| S_ORG_EXT | X_ACCRUAL_FLG | Character | 1 | Y | N | | Join Field[I] |
| S_PARTY | | | | | | | MVF |
| S_ORG_EXT_XM | ATTRIB_38 | Varchar | 50 | Y | | | Join Field |
| S_PARTY | VAL | | | | | | Join Field |
| S_ORG_EXT | ALIAS_NAME | Varchar | 100 | Y | | | Join Field |
| S_PARTY | | | | | | | MVF |
| S_PARTY | | | | | | | MVF |
| S_ORG_EXT | NAME | Varchar | 100 | N | | | Join Field |
| S_ORG_EXT | X_MESSAGE | Varchar | 255 | Y | | | Join Field[I] |
| S_PARTY | | | | | | | MVF |
| S_ORG_EXT | ACCNT_TYPE_CD | Varchar | 30 | Y | | CUT_ACCOUNT_TYPE | Join Field[I] |
| S_ORG_EXT | BASE_CURCY_CD | Varchar | 20 | Y | | | Join Field[I] |
| S_ORG_EXT | BO_CUST_GRP_CD | Varchar | 30 | Y | | ACCOUNT_GROUP_TYPE | Join Field[I] |
| S_ORG_EXT_LSX | AMT_CURCY_CD | Varchar | 30 | Y | | | Join Field[I] |
| S_PARTY | GROUP_TYPE_CD | Varchar | 30 | Y | | GROUP_TYPE_CD | |
| S_ORG_EXT | INT_ORG_FLG | Character | 1 | N | N | | Join Field[I] |
| S_ORG_EXT | MASTER_OU_ID | Varchar | 15 | Y | | | Join Field[I] |
| S_PARTY | PARTY_TYPE_CD | Varchar | 30 | N | | | |
| S_PARTY | PARTY_UID | Varchar | 100 | N | | | |
| S_ORG_EXT | PRIVACY_CD | Varchar | 30 | Y | | PRIVACY_CODE | Join Field[I] |
| S_ORG_EXT | OU_TYPE_CD | Varchar | 30 | Y | | ACCOUNT_TYPE | Join Field[I] |
| S_PARTY | PARTY_TYPE_CD | Varchar | 30 | N | | | Table Req Col |
| S_PARTY | PARTY_UID | Varchar | 100 | N | | | Table Req Col |
| S_PARTY | ROOT_PARTY_FLG | Character | 1 | N | N | | Table Req Col |

Figure 11

| EIM Table Table Name | Column Name | Type | Length | UK/Required |
|---|---|---|---|---|
| | | | | |
| EIM_ACCOUNT | CUST_STAT_CD | Varchar | 30 | N |
| EIM_ACCOUNT | ALIAS_NAME | Varchar | 100 | N |
| EIM_ACCOUNT | NAME | Varchar | 100 | N |
| EIM_ACCOUNT | ACCNT_BU<br>LOC<br>NAME | Varchar<br>Varchar<br>Varchar | 15<br>50<br>100 | N<br>N<br>N |
| EIM_ACCOUNT | X_ACCT_NAME_LOCAL_LNG | Varchar | 255 | N |
| EIM_ACCOUNT | X_ACCRUAL_FLG | Varchar | 1 | N |
| EIM_ACCOUNT2 | ACC_BU<br>ACC_LOC<br>ACC_NAME | Varchar<br>Varchar<br>Varchar | 15<br>50<br>100 | N<br>N<br>N |
| EIM_ACCNT_DTL | EXT_ATTRIB_38 | Varchar | 50 | N |
| Manual Mapping Required | | | | |
| EIM_ACCOUNT | ALIAS_NAME | Varchar | 100 | N |
| EIM_ACCOUNT | PARTY_TYPE_CD<br>PARTY_UID | Varchar<br>Varchar | 30<br>100 | Y<br>Y |
| EIM_ACCOUNT | PARTY_TYPE_CD<br>PARTY_UID | Varchar<br>Varchar | 30<br>100 | Y<br>Y |
| EIM_ACCOUNT | NAME | Varchar | 100 | N |
| EIM_ACCOUNT | X_MESSAGE | Varchar | 255 | N |
| EIM_ACCOUNT | ACCNT_BU<br>LOC<br>NAME | Varchar<br>Varchar<br>Varchar | 15<br>50<br>100 | N<br>N<br>N |
| EIM_ACCOUNT | ACCNT_TYPE_CD | Varchar | 30 | N |
| EIM_ACCOUNT | BASE_CURCY_CD | Varchar | 20 | N |
| EIM_ACCOUNT | BO_CUST_GRP_CD | Varchar | 30 | N |
| EIM_ACCNT_DTL | LSX_AMT_CURCY_CD | Varchar | 30 | N |
| EIM_ACCOUNT | GROUP_TYPE_CD | Varchar | 30 | N |
| EIM_ACCOUNT | INT_ORG_FLG | Character | 1 | N |
| EIM_ACCOUNT | MASTER_ACCNT_BU<br>MASTER_ACCNT_LOC<br>MASTER_ACCNT_NAME | Varchar<br>Varchar<br>Varchar | 15<br>50<br>100 | N<br>N<br>N |
| EIM_ACCOUNT | PARTY_TYPE_CD | Varchar | 30 | Y |
| EIM_ACCOUNT | PARTY_UID | Varchar | 100 | Y |
| EIM_FN_ACCNT1 | ACC_PRIVACY_CD | Varchar | 30 | N |
| EIM_ACCOUNT | OU_TYPE_CD | Varchar | 30 | N |
| | | | | |
| EIM_ACCOUNT | PARTY_TYPE_CD | Varchar | 30 | Y |
| EIM_ACCOUNT | PARTY_UID | Varchar | 100 | Y |
| EIM_ACCOUNT | ROOT_PARTY_FLG | Character | 1 | N |

Figure 12

| | | | | |
|---|---|---|---|---|
| View Name : PG TFM AAI Products View | | 1010 | 1012 | 1014 |
| UI Attributes (1006) | Type (1008) | Visible in UI | BC Field | BC Req |
| 1202 | | | | |
| Applet Name : PG TFM AAI Catalog Admin Catalog Plain Applet | | | | |
| | | | | |
| | | | | |
| | Control | Y | Name | Y |
| | | | Description - Translation | Y |
| | | | PG Organization Name | Y |
| | | | Version | Y |
| | | | | |
| | | | | |
| | | | | |
| | | | | |
| | | | | |
| | | | | |
| | | | | |
| Applet Name : PG TFM AAI Catalog Admin Category List Applet | | | | |
| | | | | |
| | | | | |
| | | | | |
| RELATION | | | | |
| | | | | |
| Name | List Column | Y | Description | |
| Id | List Column | Y | Name | Y |
| Level | List Column | Y | PG Category Level | |

Figure 13

| Base Table Name | Base Table Column | Type | Len | Null | Def. | LOV | Comments |
|---|---|---|---|---|---|---|---|
| S_CTLG | NAME | Varchar | 75 | N | | | |
| | | | | | | | |
| S_CTLG | NAME | Varchar | 75 | N | | | Join Field |
| S_CTLG | VERSION_NUM | Number | 22 | N | | | |
| | | | | | | | |
| S_CTLG | ACTIVE_FLG | Character | 1 | N | Y | | Table Req Col |
| S_CTLG | BU_ID | Varchar | 15 | N | 0-R9NH | | Table Req Col |
| S_CTLG | NAME | Varchar | 75 | N | | | Table Req Col |
| S_CTLG | PRIV_FLG | Character | 1 | N | N | | Table Req Col |
| S_CTLG | VERSION_NUM | Number | 22 | N | | | Table Req Col |
| | | | | | | | |
| S_CTLG_CAT | CTLG_ID | | | | | | FK Mapping |
| | | | | | | | |
| S_CTLG_CAT | DESC_TEXT | Varchar | 250 | Y | | | |
| S_CTLG_CAT | NAME | Varchar | 100 | N | | | |
| | | | | | | | |
| S_CTLG_CAT | ACTIVE_FLG | Character | 1 | N | Y | | Table Req Col |
| S_CTLG_CAT | CTLG_ID | Varchar | 15 | N | x | | Table Req Col |
| S_CTLG_CAT | DISPLAY_FLG | Character | 1 | N | n | | Table Req Col |
| S_CTLG_CAT | NAME | Varchar | 100 | N | | | Table Req Col |
| S_CTLG_CAT | NO_AUTO_RESP_FLG | Character | 1 | N | N | | Table Req Col |
| S_CTLG_CAT | NO_TRAIN_FLG | Character | 1 | N | N | | Table Req Col |
| S_CTLG_CAT | PRIV_FLG | Character | 1 | N | N | | Table Req Col |
| S_CTLG_CAT | RESP_FOLLOW_UP_FLG | Character | 1 | N | N | | Table Req Col |
| S_CTLG_CAT | ROOT_CTLG_CAT_FLG | Character | 1 | N | N | | Table Req Col |

| EIM Table Table Name | Column Name | Type | Length | UK/Required | FK Table | Default | LOV |
|---|---|---|---|---|---|---|---|
| | | | | | | | |
| 1302 | | | | | | | |
| | | | | | | | |
| EIM_CATALOG | CTLG_NAME | Varchar | 75 | Y | | | |
| | | | | | | | |
| EIM_CATALOG | CTLG_BU | Varchar | 15 | N | | | |
| EIM_CATALOG | CTLG_VERSION_NUM | Number | 22 | Y | | | |
| | | | | | | | |
| EIM_CATALOG | CTLG_ACTIVE_FLG | Character | 1 | N | | | |
| EIM_CATALOG | CTLG_BU | Varchar | 15 | N | | | |
| EIM_CATALOG | CTLG_NAME | Varchar | 75 | Y | | | |
| EIM_CATALOG | CTLG_PRIV_FLG | Character | 1 | N | | | |
| EIM_CATALOG | CTLG_VERSION_NUM | Number | 22 | Y | | | |
| | | | | | | | |
| | | | | | | | |
| 1306 | | | | | | | |
| | CTLG_VERSION_NUM | Number | 22 | N | | | |
| | CTLG_BU | Varchar | 15 | N | | | |
| | CTLG_TYPE_CD | Varchar | 30 | N | | | |
| EIM_CTLG_CAT | CTLG_NAME | Varchar | 75 | N | | | |
| 1304 | | | | | | | |
| EIM_CTLG_CAT | CAT_DESC_TEXT | Varchar | 250 | N | | | |
| EIM_CTLG_CAT | CAT_NAME | Varchar | 100 | Y | | | |
| | | | | | | | |
| EIM_CTLG_CAT | CAT_ACTIVE_FLG | Character | 1 | N | | | |
| | CTLG_VERSION_NUM | Number | 22 | N | | | |
| | CTLG_BU | Varchar | 15 | N | | | |
| | CTLG_TYPE_CD | Varchar | 30 | N | | | |
| EIM_CTLG_CAT | CTLG_NAME | Varchar | 75 | N | | | |
| EIM_CTLG_CAT | CAT_DISPLAY_FLG | Character | 1 | N | | | |
| EIM_CTLG_CAT | CAT_NAME | Varchar | 100 | Y | | | |
| EIM_CTLG_CAT | CAT_NOAUTORESP_FLG | Character | 1 | N | | | |
| EIM_CTLG_CAT | CAT_NO_TRAIN_FLG | Character | 1 | N | | | |
| EIM_CTLG_CAT | CAT_PRIV_FLG | Character | 1 | N | | | |
| EIM_CTLG_CAT | CAT_RESPFOLLOWUPFL | Character | 1 | N | | | |
| EIM_CTLG_CAT | CAT_ROOTCTLGCATFLG | Character | 1 | N | | | |

Figure 15

DATA MAPPING DOCUMENT DESIGN SYSTEM

BACKGROUND OF THE INVENTION

1. Priority Claim

This application claims the benefit of Indian Application No. 1818/MUM/2007, filed Sep. 19, 2007.

2. Technical Field

This disclosure relates to migrating data and associated data mapping between complex systems.

3. Related Art

Rapid developments in modern technology have given rise to the extraordinary growth, widespread adoption, and immense complexity of database systems. Today, database systems are critical components of the computer systems that handle almost every type of service, electronic commerce, and information processing in the global marketplace. Yet, despite all of the improvements in database technology over the years, database systems still face significant technological challenges.

One technical challenge is data migration. In most cases, a database for one processing system is created and customized without particular regard to databases already in existence in other processing systems. As a result, in order for the processing systems to exchange information and before the valuable data captured by a legacy processing system may be integrated into a new processing system, a complex data mapping document must be prepared. The data mapping document has the difficult role of establishing mappings between legacy system database tables and intermediate staging tables in an effort to ensure compliance with the way that the new processing system database stores the same data.

In the past, creating the data mapping document was an immensely labor intensive, complex, and error prone endeavor. One part of the challenge comes from the fact that even a moderately complex database may have thousands of intermediate staging tables to choose from. Another part of the challenge arises in that the author of the data mapping document had to resolve immense disparities between databases, manually consult extensive sets of documentation to understand data types, formats, and database tables, and construct the data mapping document by hand. The complexity led to frequent errors which led lead to frequent rework of the data mapping document and additional poisonous drudgery before a usable data mapping document resulted. It is also difficult to find and retain individuals with superior data mapping skills. Accordingly, achieving a system migration with existing staff and within a desired time frame is an ever increasing challenge.

Therefore, a need exists for a data mapping document design system and design tool that address the problems noted above and other previously encountered.

SUMMARY

A data mapping document design system provides technical solutions to the difficult technical problems associated with the costly, complex, and error prone endeavor of manually creating a data mapping document. The data mapping document specifies how legacy data should be loaded into a target database. The system not only achieves cost and time savings in clearly measurable aspects of data migration such as migration project cost and completion timelines, but also achieves improvements in data quality, reduces occurrences of later discovered data errors, and provides technical innovations that may allow the system to more efficiently and correctly generate the data mapping document for a target database.

In one implementation, the system obtains a view selection specifying an application view. The system also analyzes the application view to ascertain the component applets of the application view. The component applets display data stored in the target database in target database tables and columns within the tables.

The target database system implements intermediate staging tables. In support of a data migration engine, the intermediate staging tables provide a holding area for importing legacy data into the target database columns. There is a complex web of intermediate staging tables and associated target database columns. Repository metadata establishes relationships between intermediate staging tables and target database columns. The system analyzes the repository metadata to determine the intermediate staging tables that may import legacy data into any particular target database column.

The system also builds an intermediate mapping that includes target database column identifiers for the target database columns, intermediate staging table identifiers for the intermediate staging tables, and mapping permissibility indicators between the first set of intermediate staging tables and the target database columns. A search algorithm runs on the intermediate mapping to determine an intermediate staging table selection for mapping the legacy data to the target database columns in the target database through the intermediate staging tables. Given the intermediate staging table selection, the system creates a data mapping document that sets out the intermediate staging table selection and its mapping to the target database columns.

The system also provides a data mapping tool to facilitate database engineer interaction with the data mapping document design system. The data mapping tool may be presented through a graphical user interface. The data mapping tool generates an application view selection interface for obtaining an application view selection supported by the target database. The data mapping tool also generates a database mapping mode selection interface that accepts a mapping mode selection (e.g., an automatic mapping mode selection) from among multiple different mapping modes. The data mapping tool initiates, based on the mapping mode selection, execution of a data mapping analysis from intermediate staging tables to target database columns in the target database to determine an intermediate staging table selection for mapping the target database columns. The data mapping tool further provides a data mapping document completion interface that reports creation of a data mapping document based on the intermediate staging table selection.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system and tool may be better understood with reference to the following drawings and description. The elements in the figures are not necessarily to scale, emphasis instead being placed upon illustrating the principles of the capability analysis techniques. In the figures, like-referenced numerals designate corresponding parts throughout the different views.

FIG. 7 illustrates a log extract that shows example component applet fields, field types, base tables, and base columns.

FIG. 8 illustrates a log extract that shows an intermediate mapping that includes target database column identifiers for target database columns, intermediate staging table identifiers for intermediate staging tables, and mapping permissibility indicators between the intermediate staging tables and the target database columns.

FIG. 9 illustrates a log extract that shows a join table intermediate mapping that includes join table column identifiers for the join table columns, intermediate staging table identifiers for intermediate staging tables, and mapping permissibility indicators between the intermediate staging tables and the join table columns.

FIG. 10 illustrates an example of an applet specification section of a data mapping document for a component applet of an application view.

FIG. 11 illustrates an example of a base table specification section of a data mapping document, including target database columns that provide data for component applet.

FIG. 12 illustrates an example of an intermediate staging table specification for the target database columns for mapping legacy data to the target database columns through the intermediate staging tables noted in the intermediate staging table specification.

FIG. 13 illustrates a second example of an applet specification section of a data mapping document for a component applet of an application view, including an applet relation specification.

FIG. 14 illustrates a second example of a base table specification section of a data mapping document, including target database columns that provide data for component applet, including an applet relation specification.

FIG. 15 illustrates a second example of an intermediate staging table specification for the target database columns for mapping legacy data to the target database columns through the intermediate staging tables noted in the intermediate staging table specification, including an applet relation specification.

DETAILED DESCRIPTION OF THE PREFERRED EMBODIMENTS

Exemplary aspects, features, and components of the system and tool are described below. However, the system and tool may be implemented in many different ways. For example, although some features are shown stored in computer-readable memories (e.g., as logic implemented as computer-executable instructions or as data structures in memory), all or part of the system, tool, and their logic and data structures may be stored on, distributed across, or read from other machine-readable media. The media may include hard disks, floppy disks, CD-ROMs, a signal, such as a signal received from a network or received over multiple packets communicated across the network.

The system and tool may be implemented with addition, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both. In one implementation, the system and tool are built on Microsoft™ Visual Basic 6 and Microsoft™ Windows, with a Visual Basic™ forms front end and a Siebel™ repository backend.

Figure 1:
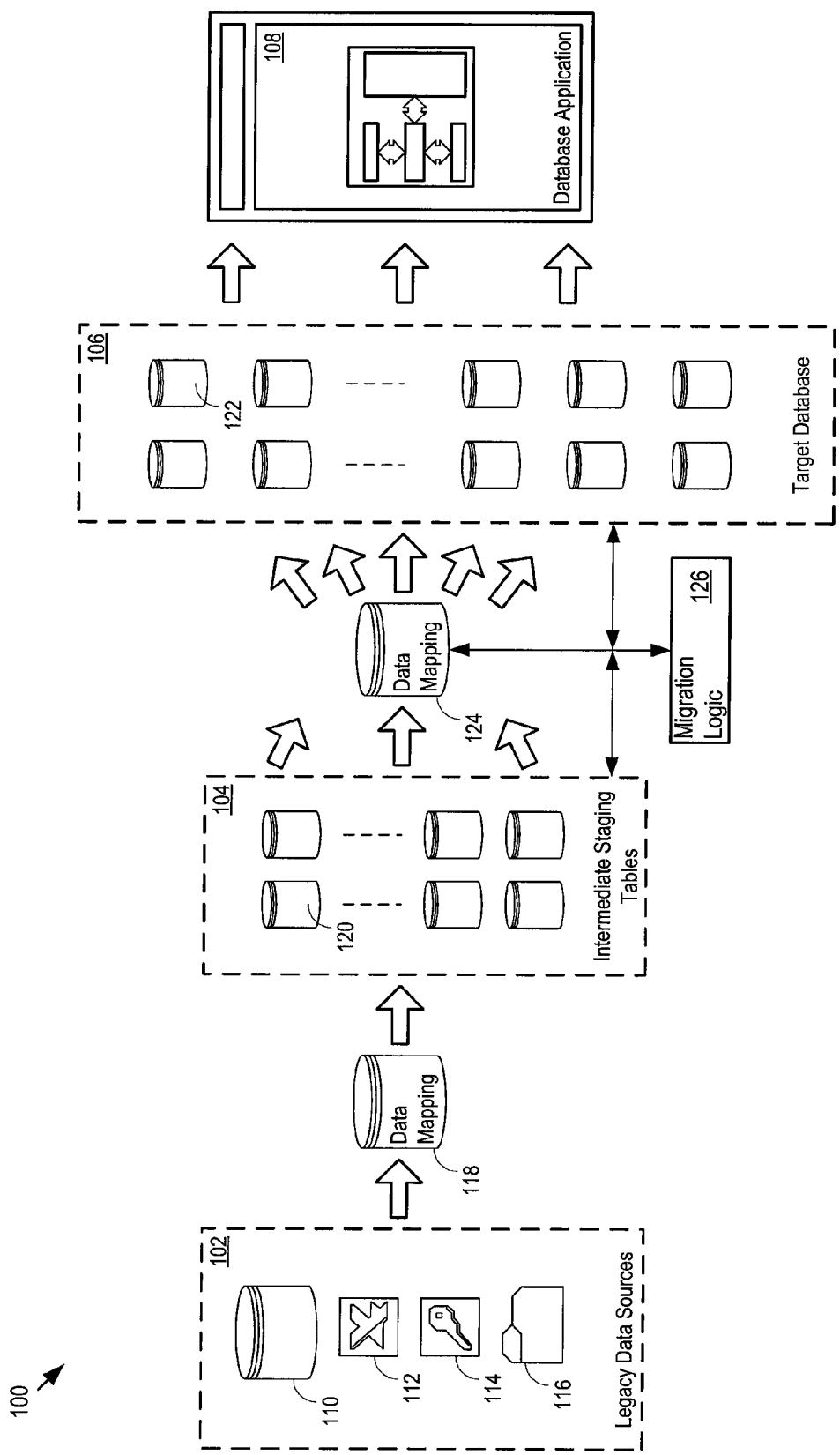
FIG. 1 shows the flow of legacy data through a data mapping process from legacy data sources to a target database.

FIG. 1 shows dataflow 100 of legacy data through a data mapping process. The data mapping process guides the data from legacy data sources 102, through intermediate staging tables 104, to a target database 106. A database application 108 obtains data to render its application views from the target database 106.

The legacy data sources 102 include, as examples, databases 110, Excel spreadsheets 112, access databases 114, and flat files 116. The legacy data sources 102 may include other types of data sources. The legacy data flows from the legacy data sources 102 through an initial data mapping 118 into the intermediate staging tables 104. The intermediate staging tables 104 serve as a temporary repository for the incoming legacy data. The intermediate staging tables 104 may include any number of individual intermediate staging tables 120. In one implementation, the database system that implements the target database 106 provides the intermediate staging tables 120 to support an automated data migration process into base tables 122 in the target database 106. For example, in a Siebel™ database system, the Siebel Enterprise Integration Manager (EIM) provides data migration logic 126 that manages the exchange of data between the Siebel™ database (i.e., target) tables and legacy systems through the intermediate (EIM) staging tables.

Each intermediate staging table 120 may support one or more base tables 122 in whole or in part. In order to import or export data effectively, the database engineer must obtain an accurate data mapping 124 between the intermediate staging tables 104 and the base tables 122. The data mapping 124 may take the form of a data mapping document in an Excel™ spreadsheet, but may take other forms. After the legacy data is loaded from the legacy system to the intermediate staging tables 120, the EIM manager (or other data migration logic 126) may transfer the legacy data to the target database 106 table. Hence, the intermediate staging tables 120 act as the data transition point between the legacy and target tables. An accurate data mapping 124 helps to precisely load the legacy data into the target database 106. Nevertheless, constructing the data mapping 124 was, in the past, a time consuming and error prone manual process that could only be accomplished by experienced database engineers intimately familiar with the complex web of target database base tables 122, database applications 108, and intermediate staging tables 120.

Figure 2:
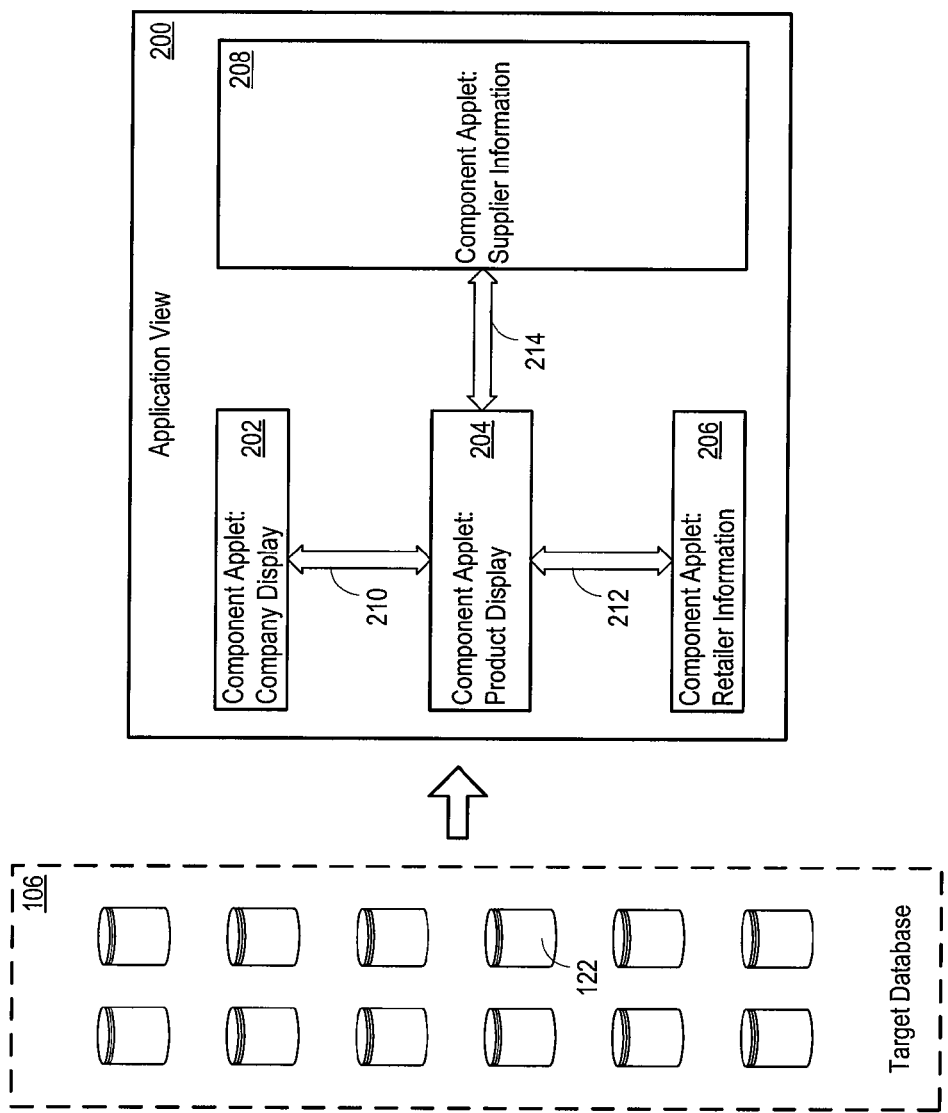
FIG. 2 shows an application view with component applets.

FIG. 2 shows an example of an application view 200 including component applets. Specifically, in the example shown in FIG. 2 the application view 200 includes a company display component applet 202, a product display component applet 204, a retailer information component applet 206, and a supplier information component applet 208. In addition, applet relations exist between the component applets. For example, a product display relation 210 exists between the product display component applet 204 and the company display component applet 202. A retailer applet relation 212 and a supplier information applet relation 214 also exist as shown in FIG. 2. The applet relations establish communication relationships between the component applets. For example, when an operator selects a particular company from the company display component applet 202, the product display component applet 204 responsively displays products made by the company. Similarly, the retailer information component applet 206 responsively displays retailers who carry the product, while the supplier information component applets 208 responsively displays component parts suppliers for the product. The application view shown in FIG. 2 is one example only, and any number of application views of any configuration and complexity may be implemented on top of the target database 106.

Despite the bewildering array of potential application views of enormous complexity, the data mapping document design system generates a highly accurate data mapping document for any selected application view. In doing so, the data mapping document design system takes into consideration not only the component applets of an application view, but also the applet relations between the component applets. The data mapping document design system further takes into consideration multiple different types of database fields including single value fields (SVFs), multiple value fields (MVFs), and join fields.

Figure 3:
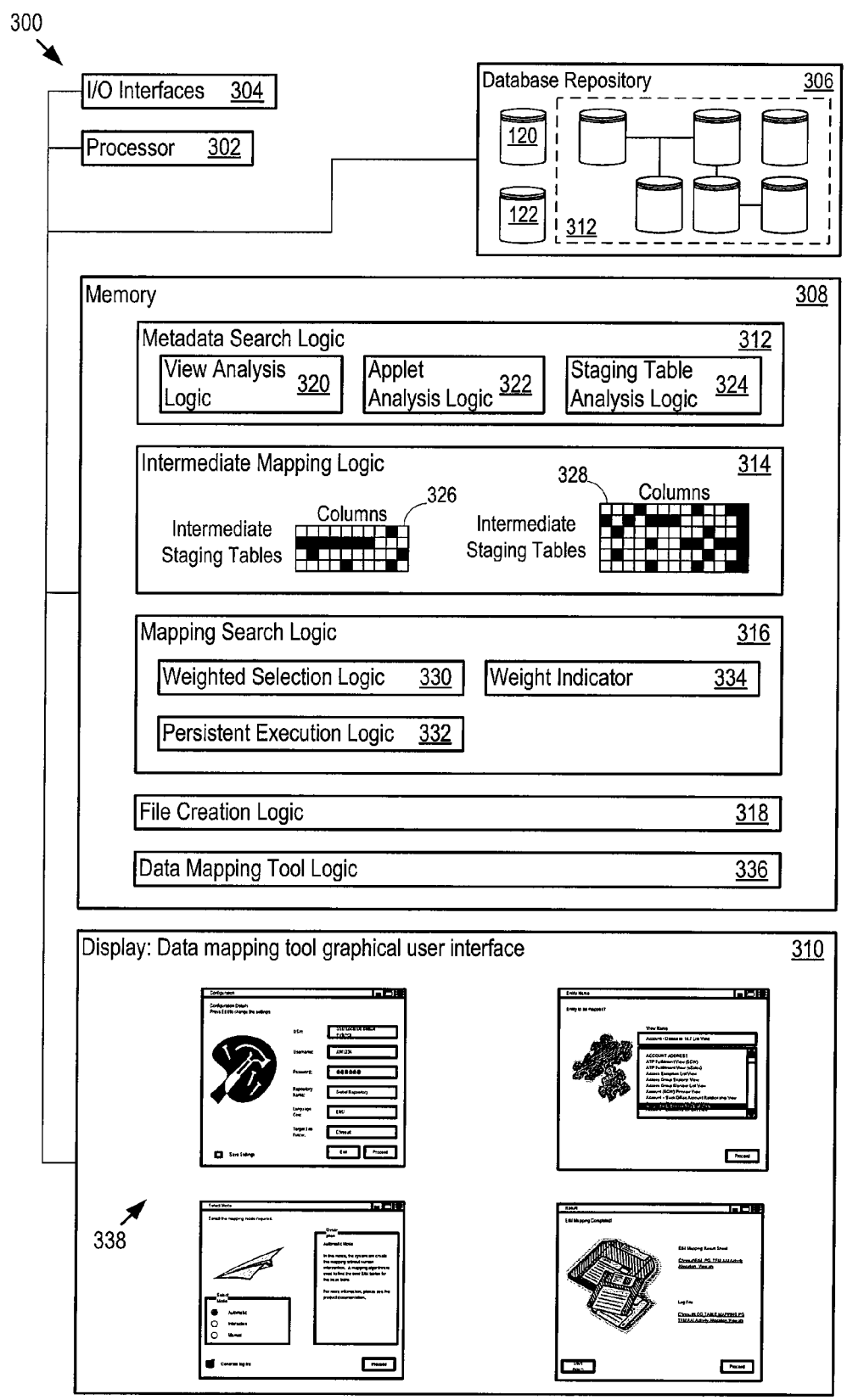
FIG. 3 shows a data mapping document design system.

FIG. 3 shows an example of a data mapping document design system 300 ("system 300"). The system 300 includes a processor 302, input/output interfaces 304, and a database repository 306. The I/O interfaces 304 may implement a keyboard interface, mouse interface, touchscreen, voice recognition interface, or any other I/O interface.

The system 300 also includes a memory 308, and a display 310. The database repository 306 includes a collection of information specific to the target database 106, including the base tables 122, the intermediate staging tables 120, and target database metadata 312 ("metadata 312"). The metadata 312 provides information that defines, explains, details, or otherwise describes the target database 106, the base tables 122, the intermediate staging tables 120, the application views, component applets, the relationships between such structures, and any other structure as relations applicable to the target database 106. Some or all of the metadata 312 may be provided by the database system upon installation, but the metadata 312 may also be expanded, changed, or otherwise modified as the data base 106 evolves. For example, when a database engineer defines a new application view, the database engineer (or the design tool for the application view) may generate metadata describing the application view and application relations.

The metadata 312 may take many different forms. As examples, the metadata may include database, text, Extensible Markup Language (XML) or Excel spreadsheet tables or documents that describe field names, field types, and applicable intermediate staging tables for particular fields. Any of the metadata 312 may include links to additional metadata 312, forming, for example, a hierarchy of tables with progressively more detail concerning the definition and structure of the base tables 122 and intermediate staging tables 120. The metadata 312 may be created and stored in the database repository 306 as part of the process of designing and implementing new base tables 122, application views 200, and intermediate staging tables 120.

Logic in the memory 308 facilitates the mapping of intermediate staging tables 120 to the base tables 122. In the implementation shown in FIG. 3 (with further detail in FIG. 4), the memory 308 holds metadata search logic 312, intermediate mapping logic 314, and mapping search logic 316. In addition, the memory 308 also holds file creation logic 318 which writes a data mapping document based on the results obtained by the intermediate mapping logic 314 and the mapping search logic 316.

The metadata search logic 312 includes applet analysis logic 322, staging table analysis logic 324, and view analysis logic 320. The view analysis logic 320 includes instructions that analyze the selected application view. As examples, the view analysis logic 320 may retrieve the application view parameters, such as identifiers of the component applets of the application view and indicators that specify which of the component applets are visible, the mode in which the component applets run, and other application view parameters from the metadata 312.

The applet analysis logic 322 includes instructions that analyze each component applet determined by the view analysis logic 320. As examples, the applet analysis logic 322 may obtain component applet parameters by searching the metadata 312. Such parameters may include, for example, identifiers that specify which of the component applet columns are visible.

The staging table analysis logic 324 includes instructions that search the metadata 312 to determine the intermediate staging tables 120 that may load any particular base table or column in the base table. The metadata 312 may establish the permissible intermediate staging tables using flags, fields, text description, or other mechanism that links an intermediate staging table 120 (or column in the intermediate staging table) to one or more base tables or columns. The permissible intermediate staging tables 120 for a specific base table or column may be those that the data migration logic 126 recognizes as permissible holding tables for data to migrate into the specific base table and columns. Each base table or column may have zero or more intermediate staging tables 120 that the data migration logic 126 is configured to use as staging tables. Accordingly, a technical difficulty arises with regard to which intermediate staging tables to choose for the data migration. When more than a few base tables are involved, and the mapping complexity rises exponentially.

The intermediate mapping logic 314 builds intermediate mappings of intermediate staging tables to target database columns. In other words, once the staging table analysis logic 324 has located permissible intermediate staging tables, the intermediate mapping logic 314 generates intermediate mappings. The intermediate mappings may include target database column identifiers for the target database columns, intermediate staging table identifiers for permissible intermediate staging tables, and mapping permissibility indicators between the permissible intermediate staging tables and the target database columns. Two intermediate mappings 326 and 328 are shown in FIG. 3, where a solid square shows a mapping permissibility indicator from an intermediate staging table to a target database column. More detailed examples are discussed below.

Because every intermediate staging table is not available to migrate data into every base table, the set of permissibility indicators in the intermediate mappings assist the mapping search logic 316 to select a set of intermediate staging tables for building the data mapping 124. More specifically, the mapping search logic 316 implements a search algorithm that searches the intermediate mappings to determine an intermediate staging table selection for mapping the source database data to the target database columns through the selected intermediate staging tables. In one implementation, the search algorithm includes weighted selection logic 330 and persistent execution logic 332. As will be described in more detail below, the weighted selection logic 330 generates weight indicators 334 upon analysis of the intermediate mappings. The persistent execution logic 332 executes the weighted selection logic until an intermediate staging table selection that covers some or all of the base table columns in each intermediate mapping is obtained. Thus, if the intermediate mapping includes a mapping solution for all of the base table columns, the mapping search logic 316 will provide a complete mapping of intermediate staging tables to the base table columns. Otherwise, the mapping search logic 316 may provide a partial mapping of intermediate staging columns to the base table columns to the degree allowed by the intermediate mapping.

The file creation logic 318 includes instructions that write the intermediate staging table and column selection to a data mapping document. As one example, the data mapping document may be an Excel™ spreadsheet, Word™ document, text document, or other document. Examples of the sections that may be included in the data mapping document are described in more detail below.

The system 300 may execute the data mapping tool logic 336 to coordinate system processing, which may be directed through a data mapping tool graphical user interface 338. The display 310 and data mapping tool logic 336 provide a mechanism through which the database engineer may interact with the user interface 338. Specific examples of the implementation of the graphical user interface 338 provided by the data mapping tool logic 336 are described below. However, the system 300 may generate and display interfaces with additional, fewer, or different interface screens.

Figure 4:
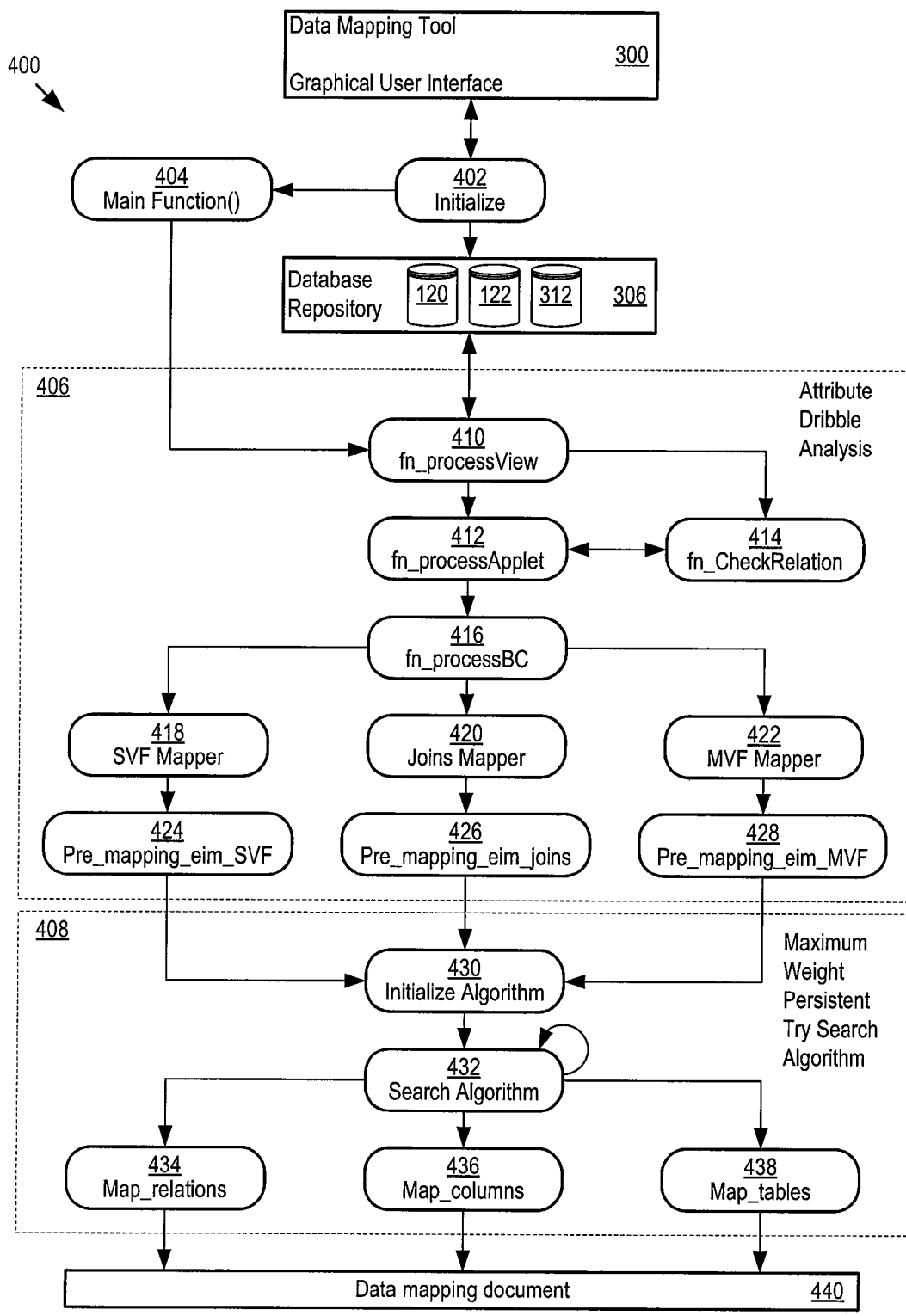
FIG. 4 shows a logic architecture for the data mapping document design system.

FIG. 4 shows a logic architecture 400 for data mapping document design that the system 300 may implement. In the logic architecture 400, initialization logic 402 prepares the system 300 to execute a fully automatic, partially automatic, or manual mapping of intermediate staging tables to base tables. In that regard, the initialization logic 402 may accept database parameters, attempt to connect to the target database 106 and database repository 306, determine whether the connection is successful, initialize variables, and perform other initial processing.

The main logic 404 includes instructions that orchestrate the data mapping processing that the system 300 performs. The main logic 404 may coordinate execution of the metadata search logic 312, intermediate mapping logic 314, mapping search logic 316, and file creation logic 318 as described in more detail below. The result is a data mapping document that specifies a mapping of intermediate staging tables 120 and columns to database base tables 122 that support any selected application view. The main logic 404 may coordinate display of a list of available application views, accept a selection of an application view, and pass the application view selection to the process view function 410.

In the example shown in FIG. 4, the main logic 404 coordinates execution of the system 300 and two primary analysis areas. The first analysis area is an attribute dribble analysis 406. The second analysis area is a maximum weight persistent try search analysis 408. In general, the attribute dribble analysis 406 explores any selected application view, determines component applets, relations between component applets, and component applet characteristics, and also generates intermediate mappings for single value fields, multiple value fields, and join fields. The attribute dribble analysis 406 begins at the entity level and flows down to the child components. The attribute dribble analysis 406 also identifies the business logic behind each component and then searches downward to the database level and find out the actual target database tables and columns that store the data used in the component applets of the application view. The maximum weight persistent try analysis search analysis 408 repeatedly evaluates the intermediate mappings, determines a selection of intermediate staging tables, and maps individual columns in the intermediate staging tables to the target database space columns that support the selected application view.

In the attribute dribble analysis 406, the process view logic 410 accepts a view selection that specifies an application view and queries the metadata 312 to determine the component applets of the application view and parameters of the component applets, such as which component applets are visible. The process applet logic 412 accepts the determination of the component applets and searches the metadata 312 to determine component applet parameters and characteristics, such as which fields in the component applets are visible. The component applet characteristics and application view characteristics may be written to the data mapping document or to a log file as additional information for the database engineer.

The check relation logic 414 analyzes the metadata 312 to determine whether any applet relations exist between component applets. Some component applets display information depending on and or responsive to data shown or selected in another component applet. In the example shown in FIG. 2, the company display component applets 202 as a product display relation 210 with the product display component applet 204. Accordingly, the product display component applet 204 responds to a company selection and the company display component applet 202 by displaying products available from the company. The system 300 determines the applet relations, determines the supporting base tables and intermediate staging tables for migrating data into the supporting base tables, and writes the mapping into the data mapping document.

The process BC logic 416 identifies the business logic behind each component applet by analyzing the business component layer. Given the business logic, the process BC logic 416 searches downward to the database level to discover the target database tables, target database table columns, and the column type (e.g., a multiple value field (MVF) type, a single value field (SVF) type, or a join field type) that store the data used in the component applets of the application view. In one implementation, the process BC logic 416 searches the metadata 312 for records, tables, or other information on the base table column that specify the column type. For example, a target database column called "Last Name" in a particular base table may have one or more metadata entries that specify that the "Last Name" column in that particular base table is a SVF.

Turning to FIG. 7, a log extract 700 shows an example of component applet fields 702, field types 704, base columns 706, and the join name/table 708 that may be discovered by the attribute dribble analysis 406. The system 300 may generate the log file during processing. The log extract 700 shows that the logic 410-416 has determined the names of the fields in a particular component applet (e.g., "Account Status" 710, "Street Address" 712, and "Party UID" 714). The logic 410-416 has also determined that the Account Status field is a Join Field on the column CUST_STAT_CD with a join table of S_ORG_EXT. Similarly, the logic 410-416 has determined that the Street Address field is a MVF (for the reasons given below, no target database column is identified for a MVF), and that the Party UID field is a SVF stored in the base table column named PARTY_UID.

With regard again to FIG. 4, the attribute dribble analysis 406 also includes single value field (SVF) mapper logic 418, joins mapper logic 420, and multiple value field (MVF) mapper logic 422. As an overview, each of the mapper logic 418-422 includes instructions that determine a list of all SVFs, join fields, or MVFs, respectively, in the component applets. To that end, the mapper logic 418-422 may compile the results obtained by the process BC logic 416 or execute additional or different searches through the metadata 312. The mapper logic 418-422 also builds a template intermediate mapping that includes intermediate staging table identifiers and target database column identifiers. The pre-mapping logic, described below, may then search the metadata 312 to determine permissibility indicators between the individual target database columns and intermediate staging tables to add to the template intermediate mappings.

Given the lists of SVFs, MVFs, and join fields, the mapper logic 418-422 may also analyze the metadata 312 to determine, given the target database tables, which intermediate staging tables are available to load the target database tables. Thus, when the process BC logic 416 has identified the particular base table columns that support a component applet, the mapper logic 418-422 may create lists of field types and the mapper logic 418-422 may search the metadata 312 for records, tables, or other information on the base table column that specify which intermediate staging tables are available to load the base table columns.

In more detail, the SVF mapper logic 418 searches the metadata 312 to discover the intermediate staging tables applicable to the SVFs. In that regard, the SVF mapper logic 418 may search the metadata 312 tables, records, or other information using the SVF name to find information in the metadata 312 that describes the SVF and identifies the intermediate staging tables that have been established to load the SVF.

The MVF mapper logic 422 and the joins mapper logic 420 handle MVFs and join fields, respectively. For example, for an MVF in a given base table, there is typically a separate multi-value base table that stores the possible values for the MVF. The MVF mapper logic 422, knowing the MVF field name, may search the metadata 312 to find the multi-value base table, as well as a MVF relation that links the multi-value base table to the given base table. The MVF mapper logic 422 may then query the metadata 312 to determine which intermediate mapping table is available to load the MVF relation in the MV base table during the migration process. Thus, the data mapping document may specify the base table that includes the MVF, but there may be no specific base table column identified because the MVF takes values from a separate multi-value base table. Accordingly, the data mapping document instead identifies which intermediate staging table has been selected to load the relation that sets up the MVF for the particular new data to be loaded.

The joins mapper logic 420 may execute a similar search through the metadata 312. The joins mapper logic 420 handles implicit and explicit joins by searching the metadata 312 to determine the base tables involved in the join, and the intermediate staging tables that are available to load those base tables.

FIG. 4 also shows that the attribute dribble analysis 406 includes pre-mapping SVF logic 424, pre-mapping joins logic 426, and pre-mapping MVF logic 428. The pre-mapping logic 424-428 determines the permissibility indicators for the intermediate mappings. In particular, the pre-mapping SVF logic 424 accepts the identification of the (potentially many) intermediate staging tables available to load an SVF in a base table column, and completes a template SVF intermediate mapping with permissibility indicators for the SVFs. The SVF intermediate mapping includes target database column identifiers for the SVF target database columns, intermediate staging table identifiers for the intermediate staging tables that may load the SVF target database columns, and mapping permissibility indicators between the first set of intermediate staging tables and the target database columns. A mapping permissibility indicator specifies whether the data migration logic 126 may use a particular intermediate staging table may be used to load any specific target database column.

Similarly, the pre-mapping joins logic 426 determines permissibility indicators and completes a join table intermediate mapping. The join table intermediate mapping includes join table column identifiers for the join table columns, intermediate staging table identifiers for the intermediate staging tables that may load the join table relationships, and mapping permissibility indicators between the intermediate staging tables and the join table columns. The pre-mapping MVF logic 428 builds an MVF table intermediate mapping. The MVF table intermediate mapping specifies the MVF identifiers for the MVFs, intermediate staging table identifiers for the intermediate staging tables that may load the MVF relations, and mapping permissibility indicators between the intermediate staging tables and the join table columns.

Turning to FIG. 8, a log extract shows a portion of an SVF intermediate mapping 800, including target database column identifiers (e.g., 802) for target database columns, intermediate staging table identifiers (e.g., 804) for intermediate staging tables, and mapping permissibility indicators (e.g., 806) between the intermediate staging tables and the target database columns. The intermediate mapping 800 shows a selection of twenty intermediate staging tables that could potentially load one or more of the target base columns, as noted by '1' mapping permissibility indicators. For example, GROUP_TYPE_CD may be loaded from the intermediate staging table EIM_ACCOUNT, but not from the intermediate staging table EIM_ACCNT_PROF. The intermediate mapping entry 808, for EIM_ACCOUNT, shows that EIM_ACCOUNT may load all of the base table columns under consideration. However, other combinations of intermediate staging tables, such as EIM_BU and EIM_ACCDTL_TNT may also be used to provide a mapping to the base table columns. The manner in which the system 300 selects the intermediate staging tables to use in the data mapping document is described below in the further discussion of FIG. 4.

In FIG. 9, a log extract shows a portion of a join intermediate mapping 900, including join column identifiers (e.g., 902) for join table columns, intermediate staging table identifiers (e.g., 904) for intermediate staging tables, and mapping permissibility indicators (e.g., 906) between the intermediate staging tables and the join table columns. The intermediate mapping 900 shows a selection of twelve intermediate staging tables that could potentially load one or more of the fifteen join table columns, as noted by the mapping permissibility indicators. For example, ACCNT_TYPE_CD may be loaded from the intermediate staging table EIM_ACCNT_CUT, but not from the intermediate staging table EIM_ACCNT_PROF. As another example, no intermediate staging table was found to load MASTER_OU_ID column 908. Nevertheless, the system 300 may return a partial mapping that covers as many of the join table columns as possible. The partial mapping for the example shown in FIG. 9 may include the intermediate staging tables EIM_ACCOUNT and EIM_FN_ACCNT1. The manner in which the system 300 selects the intermediate staging tables to use in the data mapping document is described below.

Turning back to FIG. 4, once the possible intermediate staging tables are identified, the system 300 may proceed in several different ways to select the intermediate staging tables to use in the data mapping document. When the system 300 operates in manual mode, as described in more detail below, the system 300 may display an intermediate staging table selection interface that the graphical user interface generates to display an intermediate staging table selection and accept a selection of intermediate staging tables for mapping the target database columns. When the system 300 operates in an automatic mode or interactive mode, however, the system 300 may perform an analysis on the intermediate mappings to determine a selection of intermediate staging tables for mapping the legacy data into the target database. Generally, the system 300 executes a search algorithm on the intermediate mappings individually, but in other implementations, may join intermediate mappings together into fewer mappings (e.g., merged into a single mapping with all target database columns, intermediate staging table identifiers, and permissibility indicators) and determine the intermediate staging table selection from a reduced set of intermediate mappings.

One specific example of a search algorithm is a maximum weight persistent try search. The algorithm initialization logic 430 sets up variables, parameters, and takes other preliminary steps prior to execution of the search logic 432. The search logic 432 may include the weighted selection logic 330 to determine weight indicators 334, and persistent execution logic 332 to repeat execution of the weighted selection logic 330.

Using the SVF intermediate mapping 800 as an example, the weighted selection logic 330 determines a weight indicator for each row in the intermediate mapping 800. The weighted selection logic 330 may count, add, or otherwise sum the permissibility indicators along a row to determine how many target database columns each potential intermediate staging table can load. A weight may be applied to give preference to pre-selected intermediate staging tables. Thus, for example, the EIM_ACCOUNT intermediate staging table has a weight indicator of '6', while the EIM_ACCDTL_TNT intermediate staging table has a weight indicator of '4', and the EIM_BU intermediate staging table has a weight indicator of '5'.

The weighted selection logic 330 selects the maximum weight intermediate staging table first. Thus, the weighted selection logic 330 selects EIM_ACCOUNT to include in the data mapping document. Since EIM_ACCOUNT maps all of the six base table columns, no more searching needs to be done for SVF base table columns. However, assume that EIM_ACCOUNT could not map the GROUP_TYPE_CD column. Then, the weight indicator for EIM_ACCOUNT would be '5'. When two intermediate staging tables have the same maximum weight, the weighted selection logic 330 may select the first intermediate staging table in alphanumeric order, select a random intermediate staging table, prompt for a manual selection, select the intermediate staging table with the fewest underscores ('_') or shortest name (e.g., make a selection based on ease of readability or other user friendly criteria), select based on pre-set preferences for specific intermediate staging tables, or make the selection in other manners. In this example, assume that the weighted selection logic 330 selects the EIM_BU intermediate staging table. The PARTY_TYPE_CD column still needs to be mapped, and can be mapped because there is at least one permissibility indicator set to '1' for that column. Accordingly, the persistent execution logic 332 (e.g., loop control logic) executes the weighted selection logic 330 again to consider the base database columns that yet need to be mapped (i.e., PARTY_TYPE_CD). The weighted selection logic 330 finds 19 intermediate staging tables each with a weight of 1, and picks one to complete the mapping and arrive at an intermediate staging table selection.

Given the intermediate staging table selection, the maximum weight persistent try search analysis 408 continues by executing mapping logic to pick out the particular intermediate staging table columns that map to a specific target database column. In the example shown in FIG. 4, the map relation logic 434, map columns logic 436, and map tables logic 438 perform this analysis for mapping applet relations, mapping a specific intermediate staging table column to each target database column, and mapping Required or UserKey fields, respectively.

As one example of the map logic 434-438, assume a Phone Number table with a relation to an Employee Detail table. The Phone Number table includes a Phone Number column and an Employee Number column. The employee number of an employee would be saved with his phone number in the Phone Number table to establish the relation. To find the phone number of an employee in the Employee Detail table, the system 300 finds the employee number stored against his name in the Employee Detail table and using that employee number search the Phone Number table. If any of the records in the phone number table has a matching entry, then the employee has a phone number.

When an applet relationship exists between component applets, the map relation logic 434 analyzes the logic relationship between the component applets. To do so, the map relation logic 434 queries the business component layer to determine the applet relationship characteristics. Assume, in the example above, that the relation is formed through the employee number. The map relation logic 434 then finds the particular intermediate staging column mapped to the employee number column in the selected intermediate staging table.

The map column logic 436 finds a particular intermediate staging column to map to each specific target database column in the intermediate mapping. The intermediate mappings note which intermediate staging tables map a particular target database column. The map column logic 436 then finds the particular intermediate staging table column in each intermediate staging table to map to the target database column. The table and specific columns are given in the data mapping document.

In the example above with regard to the Phone Number table, an employee number loaded with each phone number provides a way to link the employee and their phone number. Without an employee number, a phone number would not be linked to any employee. Thus, the employee number may be considered a Required or UserKey for the Phone Number table. For large tables, there may be a set of Required/UserKey combinations to populate. The map table logic 438 analyzes the metadata 312 to determine the interface mappings of Required/UserKey combinations.

Thus, given the selection of intermediate staging tables determined by the search logic 432, the map logic 434-438 searches the metadata 312 to determine the actual intermediate staging table columns that map to the target database columns supporting the selection application view. The data mapping document 440 may then capture the determinations made.

The system 300 writes a data mapping document 440 using the selected intermediate staging tables. The data mapping document 440 may vary widely in form and content. In one implementation, the data mapping document 440 includes an applet specification section, a base table specification section, an intermediate staging table specification discussed below with reference to FIGS. 10, 11, and 12.

Figure 5:
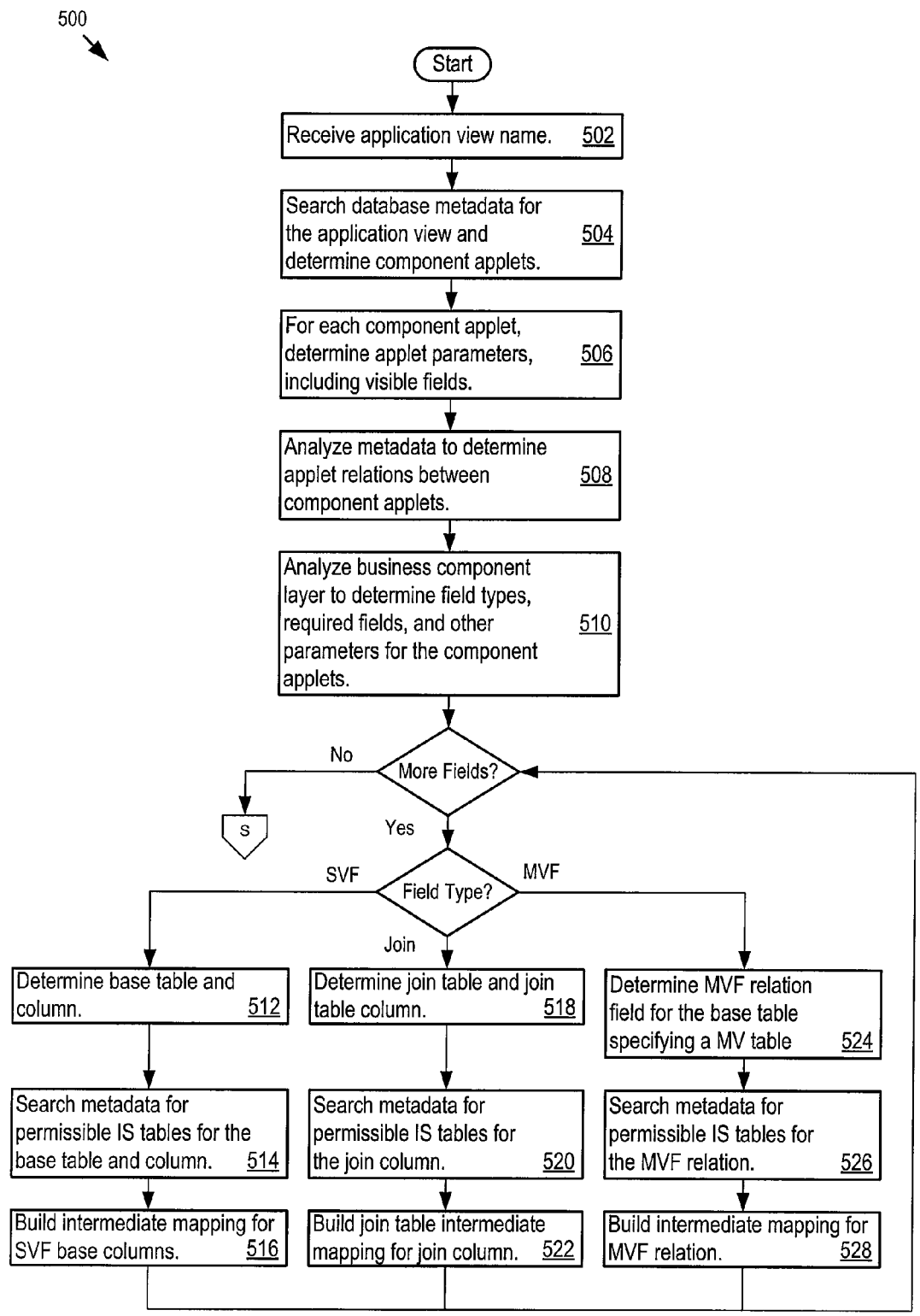
FIG. 5 shows processing flow for data mapping document design.

FIG. 5 shows processing flow for data mapping document design 500 that the system 300 and architecture 400, including the metadata search logic 312, intermediate mapping logic 314, mapping search logic 316, and file creation logic 318 may perform. The system 300 receives an application view name (502), for example, from operator input. The system 300 searches the metadata 312 for the application view to determine component applets of the application view (504). For each component applet, the system 300 determines the applet parameters (506), such as visible columns, and also analyzes the metadata 312 to determine applet relations between component applets (508). The system 300 also analyzes the business component layer to determine field types (e.g., SVF, MVF, or join field types), whether the fields are required fields, and other information with respect to each component applet (510).

The system 300 also prepares intermediate mappings as described above. When a target database field is a SVF, the system 300 first determines the target database base table and column (512). The system 300 also searches the metadata 312 for the permissible intermediate mapping tables for the target database column (514). Once the intermediate mapping tables are known for each of the SVFs, the system 300 builds a SVF intermediate mapping (516).

When a target database field is a join field, the system 300 first determines the target database join base table and join column (518). The system 300 also searches the metadata 312 for the permissible intermediate mapping tables for the join column (520). Once the intermediate mapping tables are known for each of the join columns, the system 300 builds a join table intermediate mapping (522).

When a target database field is a MVF, the system 300 determines the MV relation field in the base table and the underlying multi-value table that provides values for the MVF (524). The system 300 also searches the metadata 312 for the permissible intermediate mapping tables where the MV relation may be loaded (526). Once the intermediate mapping tables are known for each of the MVFs, the system 300 builds a MVF intermediate mapping (528).

Figure 6:
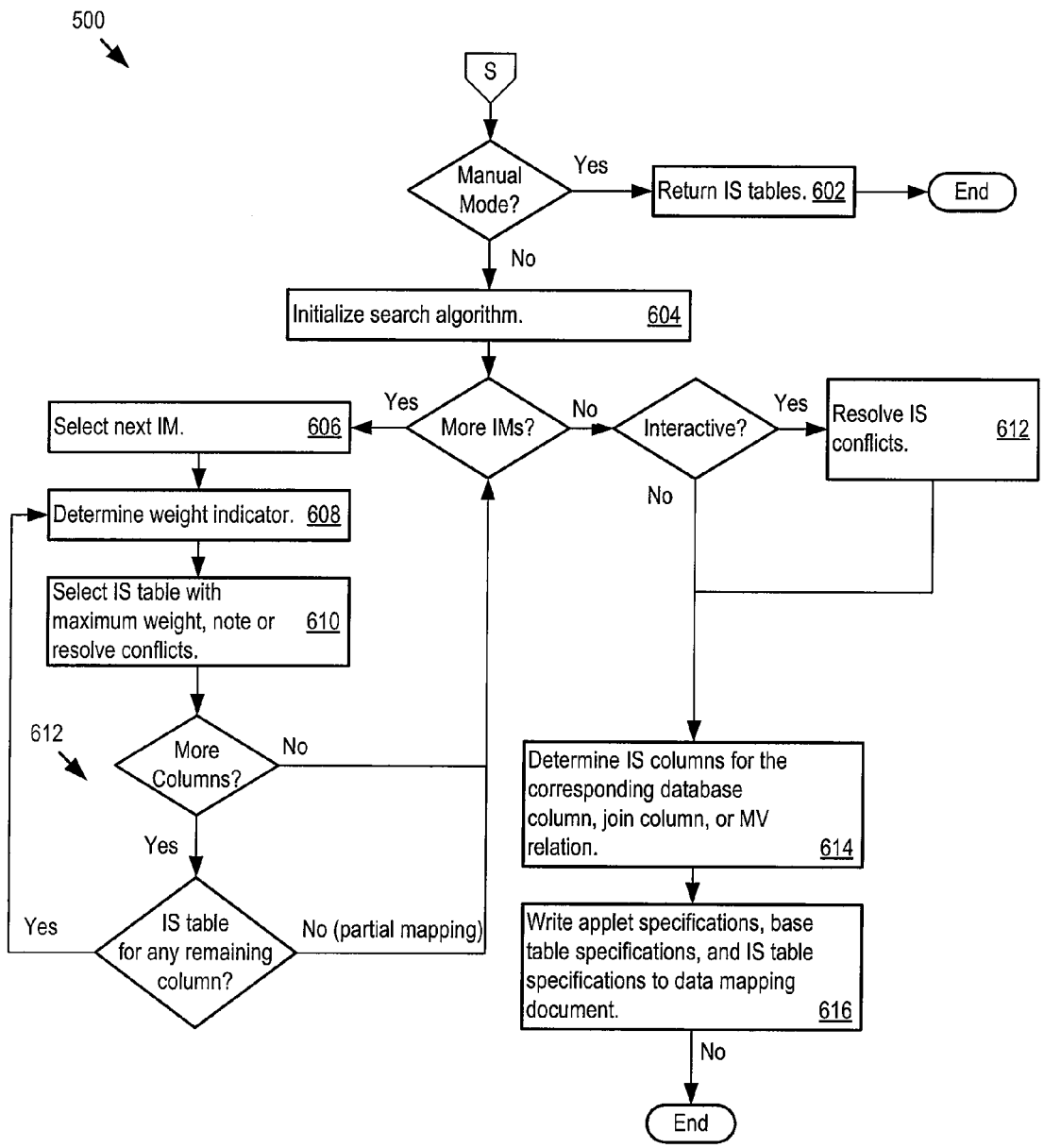
FIG. 6 shows additional processing flow for data mapping document design.

When all of the fields in the component applets have been analyzed, processing continues as shown in FIG. 6. In particular, if the system 300 is in manual mode, the system returns the intermediate staging table possibilities to a data mapping tool (602) for manual selection. The data mapping tool may run in the memory 308 and coordinate execution and display of the graphical user interface 338.

If the system 300 is in automatic or interactive mode, the system 300 initializes the search algorithm (604) and initiates the search algorithm on the intermediate mappings. Thus, system 300 may select the next intermediate mapping (606), determine weight indicators (608), and select the next maximum weight intermediate staging table (610). If the system 300 is in interactive mode, the system 300 may note conflicts (e.g., two intermediate staging tables with the same maximum weight) for manual resolution later. The system 300 persistently tries to map each target database column (612) until either a complete mapping is found, or no intermediate staging table exists that can map any remaining unmapped target database column. In the later case, the system 300 returns a partial mapping.

Once the maximum weight persistent try analysis has performed its automated selection of intermediate staging tables, the system 300, if in interactive mode, may request manual input to resolve IS conflicts (612). If not in interactive mode, the system 300 automatically resolves conflicts between intermediate staging tables (610). Given the selection of intermediate staging tables, the system 300 maps the particular intermediate staging table columns in the selection of intermediate staging tables to the corresponding target database SVF column, join column, or MV relation (614). The system 300 creates the data mapping document 440 by writing applet specifications, base table specifications, and IS table and column specifications to the data mapping document 440 (616).

FIG. 10 illustrates an example of an applet specification section 1000 of a data mapping document 440 for a component applet of an application view. The applet specification section 1000 includes the selected application view name 1002 and provides details of each component applet in separate sections that start with a component application name identifier 1004. The applet specification section 1000 includes a UI Attributes column 1006, a Type column 1008, a Visibility column 1010, a Business Component field 1012, and a Business Component Required column 1014. The UI Attributes column 1006 specifies each field name in the component applet, while the Type column 1008 specifies the data type for the field (e.g., a List Column type), and the Visibility column 1010 specifies whether the field is visible in the component applet display. The Business Component field 1012 specifies the business component layer field that corresponds to the UI Attribute field name. The Business Component Required column 1014 specifies whether the business component layer mandates a value to be present in the corresponding field.

FIG. 11 illustrates an example of a base table specification section 1100 of a data mapping document 440, including identification of target database columns that provide data for component applet. Thus, for each row in the applet specification section 1000, the base table specification section 1100 provides a Base Table Name column 1102, a Base Table Column column 1104, a Field Type column 1106, and a Length column 1108. The base table specification section 1100 also provides a Nullable column 1110, a Default column 1112, a List of Values (LOV) column 1114, and a Comments column 1116. The Base Table Name column 1102 identifies the target database table underlying the component applet field, while the Base Table Column column 1104 specifies the column within the target database table from which the component applet field values are taken. The Type column 1106 specifies the data type for the base table column, and the Length column 1108 specifies how long the field is. The Nullable column 1110 specifies whether the field may be Null, the Default column 1112 specifies whether the field has a default value, and the LOV column 1114 specifies a target database list of values from which possible values are provided, if any, for a field that can be set to one of a list of pre-set values.

FIG. 12 illustrates an example of an intermediate staging table specification 1200 of a data mapping document for the target database columns for mapping legacy data to the target database columns through the intermediate staging tables noted in the intermediate staging table specification 1200. The intermediate staging table specification 1200 includes an Intermediate Staging Table Name column 1202, a Column Name column 1204, a Type column 1206, a Length column 1208, and a Required column 1210. The Intermediate Staging Table Name column 1202 gives the name of the selected intermediate staging table for the target database column (or, if none is found or selected, that manual mapping is required), while the Column Name column 1204 gives the specific column within the intermediate staging table. The Type column 1206 specifies the data type for the intermediate staging table column, and the Length column 1108 specifies how long the field is. The Required column 1210 specifies whether the intermediate staging table column must have a value.

Taking an example from left to right from FIG. 10 through FIG. 12, the component applet named PG TFM AAI SIS Account List Applet has a field named Status that is a List Column which is visible in the component applet. The Status field corresponds to the Account Status business component layer field (not required). The Account Status field obtains values from the S_ORG_EXT base table, and specifically the CUST_STAT_CD column in the S_ORG_EXT base table. The CUST_STAT_CD field is a Varchar field, length 30, which may be Nulled. There is no Default value, and the field may accept a value from a list of values stored in the ACCOUNT_STATUS list of values. The selected intermediate staging table is EIM_ACCOUNT, and specifically the CUST_STAT_CD column in the EIM_ACCOUNT table. The CUST_STAT_CD field is a Varchar field of length 30 and is not required.

Taking another example from left to right from FIG. 10 through FIG. 12, the component applet named PG TFM AAI SIS Account List Applet has a field named Address that is a List Column which is visible in the component applet. The Address field corresponds to the Street Address business component layer field (not required). The Street Address field is a MVF. The selected intermediate staging table for setting up the MVF relation is EIM_ACCOUNT2, and specifically the ACC_BU, ACC_LOC, and ACC_NAME columns in the EIM_ACCOUNT2 table. Those fields are Varchar fields of length 15, 50, and 100.

FIG. 13 illustrates a second example of an applet specification section 1300 of a data mapping document 440 for a component applet of an application view. the applet specification section 1300 includes a first component application specification 1302, a second component applet specification 1304, and an applet relation specification 1306 for a relation between the two applets noted in the specifications 1302 and 1304. FIG. 14 illustrates a second example of a base table specification section 1400 of a data mapping document, including target database columns that provide data for component applet, including an application relation specification 1306. FIG. 15 illustrates a second example of an intermediate staging table specification section 1500 for the target database columns for mapping legacy data to the target database columns through the intermediate staging tables noted in the intermediate staging table specification, including an application relation specification 1306.

In the example shown in FIGS. 13, 14, and 15, the system 300 analyzed the metadata 312 for the component applets to determine that the applet relation 1306 existed between the two component applets listed in FIG. 13. Through the relation, for example, changes or selections made in one component applet influence the data shown in the second component applet. The metadata 312 also revealed that the applet relation 1306 has an underlying target database table S_CTLG_CAT and target database column CTLG_ID in the S_CTLG_CAT table. Searching the metadata 312 on the S_CTKLG_CAT table revealed a matching intermediate staging table EIM_CTLG_CAT, and intermediate staging table columns CTLG_VERSION_NUM, CTLG_BU, CTLG_TYPE_CD, and CTLG_NAME. Thus, by loading these columns, the data migration process links the imported data to the related applet (e.g., PG TFM AAI Catalog Admin Catalog Plain Applet detailed in FIG. 13). There may be multiple applet relations available to migrate the legacy data using specific intermediate staging table columns. The system 300 may specify one or more of the applet relations and supporting intermediate staging table columns in the data mapping document 440. The database engineer may choose any set of the intermediate staging table columns for loading the legacy data.

The discussion of FIG. 3 above noted that the data mapping tool 336 may coordinate execution of the system 300 and generate the graphical user interface 338. Examples of the interfaces that the graphical user interface generates are given below. The data mapping tool 336 may generate additional, different, or fewer interfaces, however.

Figure 16:
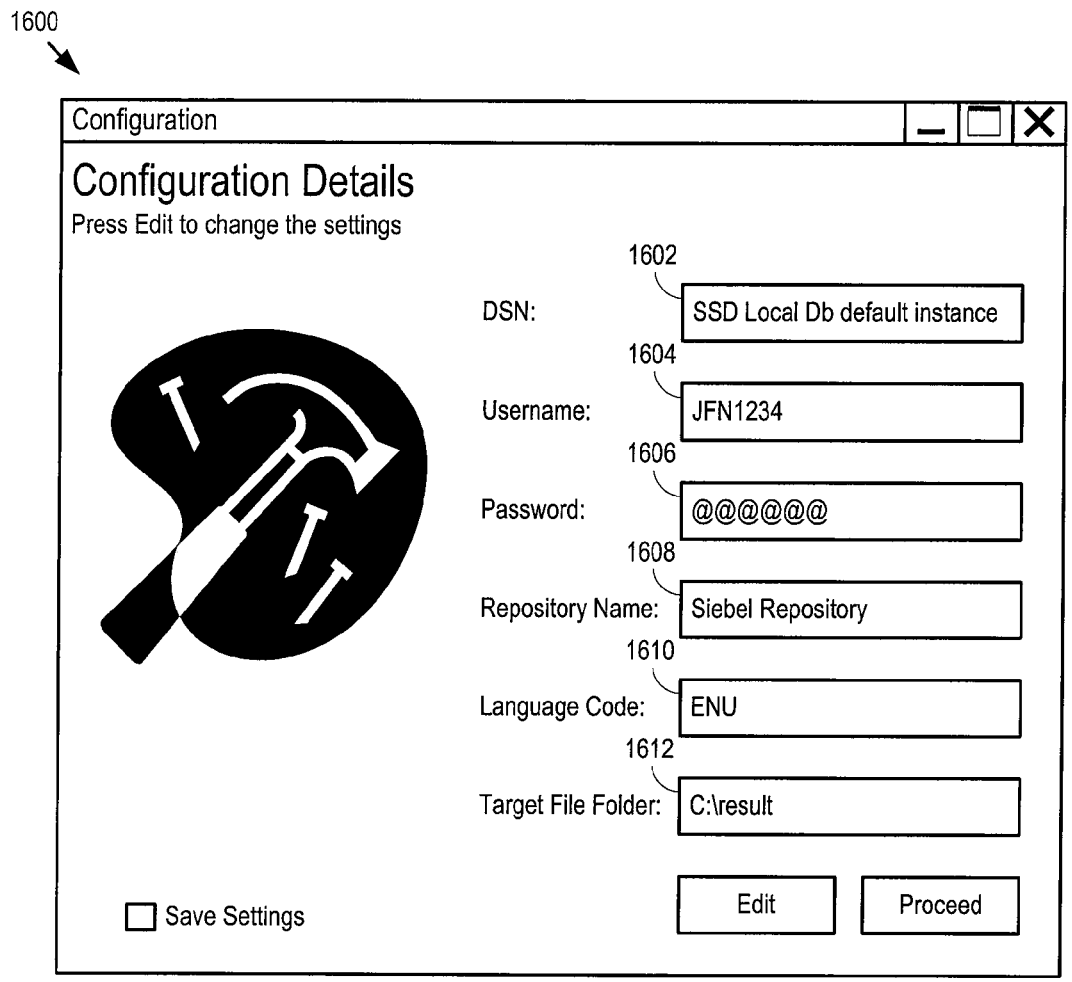
FIG. 16 shows a configuration interface that a data mapping tool generates to accept a data source name, username, password, and other parameters for specifying the target database and establish a connection to the target database.

FIG. 16 shows a configuration interface 1600 that the data mapping tool 336 generates. The configuration interface 1600 includes a data source name input 1602, a username input 1604, and a password input 1606. The configuration interface 1600 also includes a repository name input 1608, a language code input 1610, and a target file folder input 1612. The data mapping tool 336 may use one or more of the inputs 1602-1612 as parameters in an attempt to establish a connection to the target database 106 and database repository 306. The target file folder input 1612 may specific a directory where the data mapping tool 1600 writes a log file or the data mapping document 440.

Figure 17:
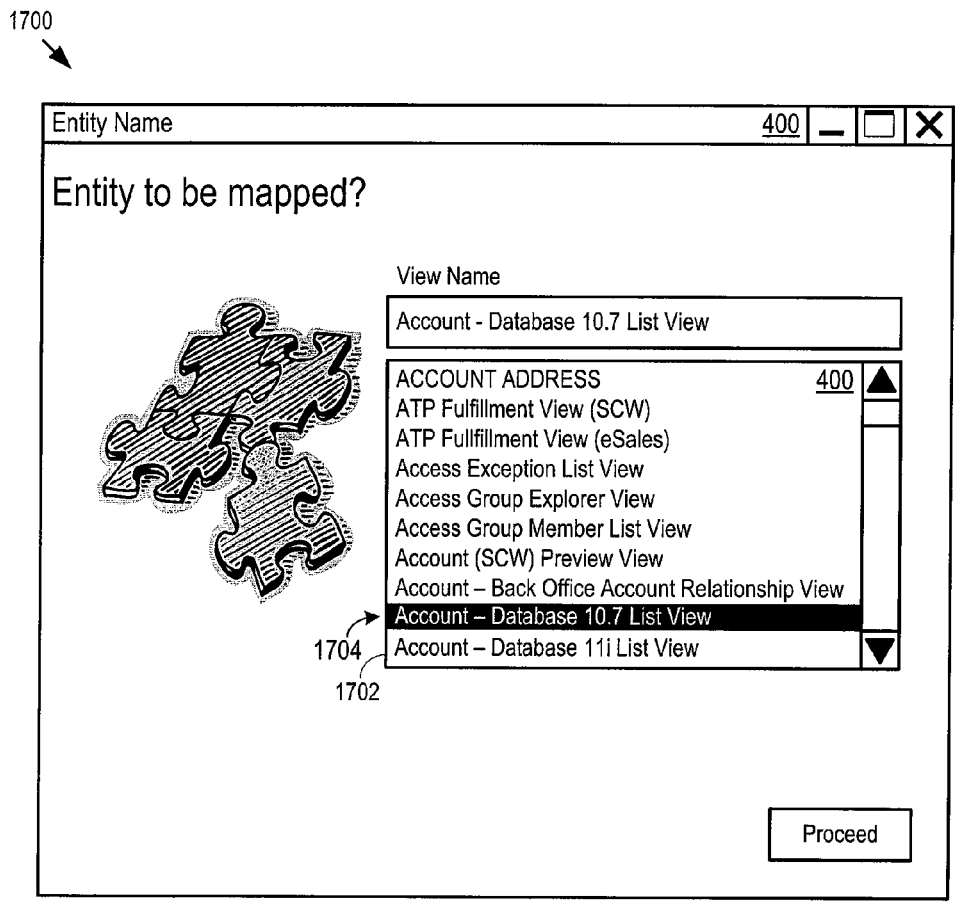
FIG. 17 shows an application view selection interface that a data mapping tool generates to obtain an application view selection.

FIG. 17 shows an application view selection interface 1700 that the data mapping tool 336 generates to obtain an application view selection. Once the data mapping tool 336 has established the connection to the database repository 306, the data mapping tool queries for application views that are defined for the target database 106. The application selection interface 1700 presents a list of available application views in the application view list box 1702. An example selection 1704 is shown: Account—Database 10.7 List View.

Figure 18:
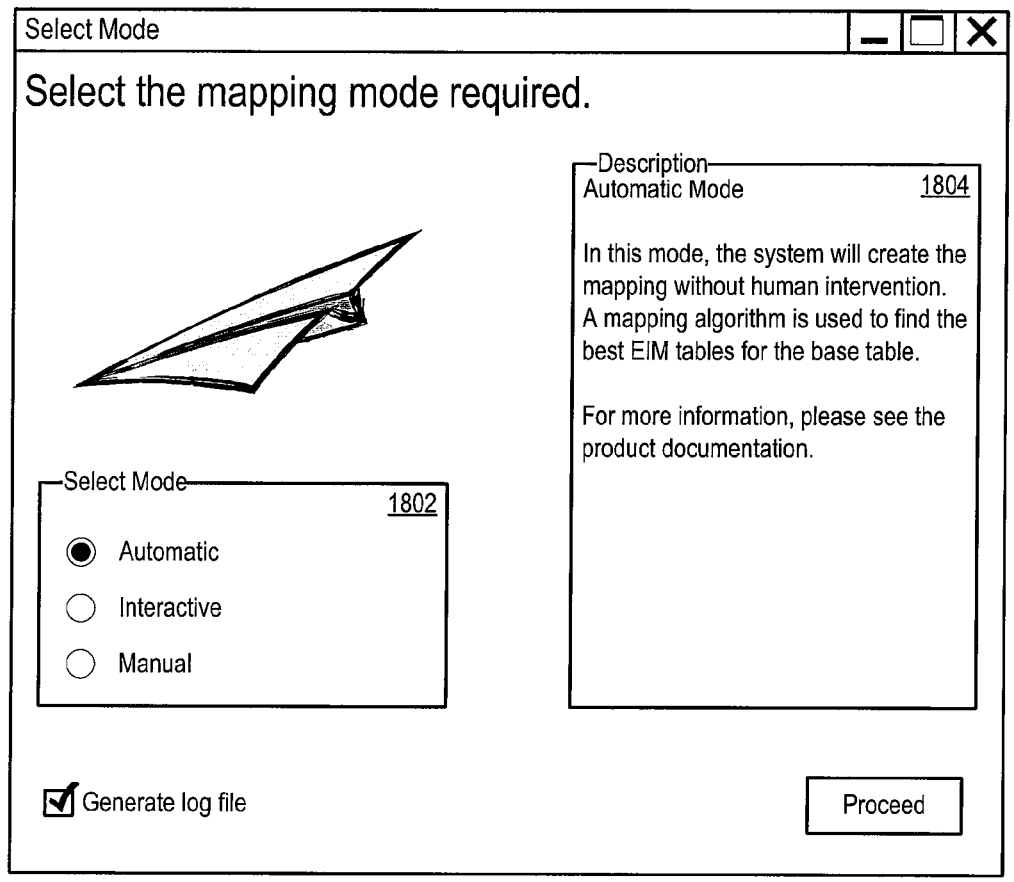
FIG. 18 shows a database mapping mode selection interface, in which automatic mapping mode is selected, that a data mapping tool generates to accept a mapping mode selection between multiple different mapping modes.

FIG. 18 shows a database mapping mode selection interface 1800, in which automatic mapping mode is selected. The mapping mode selection interface 1800 includes a mode selection window 1802 and a description window 1804 responsive to the mode selection. The model selection window 1802 gives a choice between automatic mapping mode, an interactive mapping mode, and a manual mapping mode. In the automatic mapping mode, the system 300 will perform its analysis and create the data mapping document 440 automatically.

Figure 19:
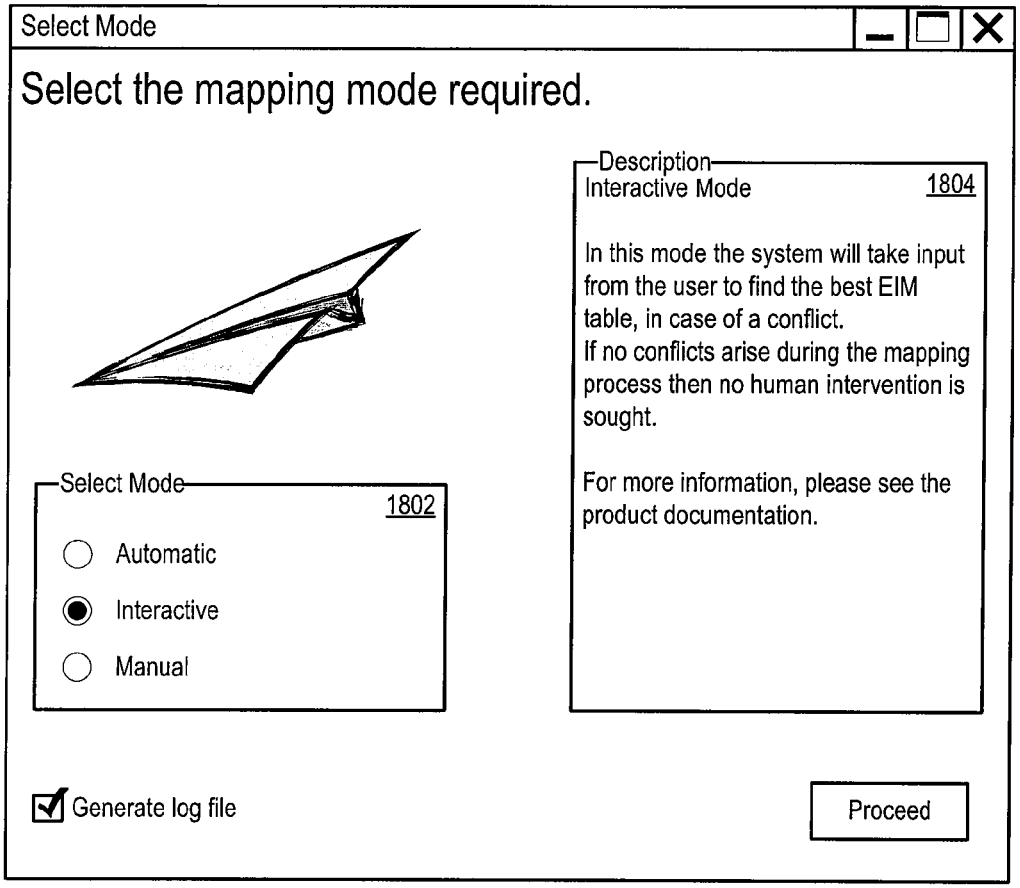
FIG. 19 shows a database mapping mode selection interface, in which the interactive mapping mode is selected, that a data mapping tool generates to accept a mapping mode selection between multiple different mapping modes.

FIG. 19 shows the database mapping mode selection interface 1800, in which the interactive mapping mode is selected. In the interactive mapping mode, the system 300 will perform its analysis and create the data mapping document 440 with operator input to resolve intermediate staging table conflicts.

Figure 20:
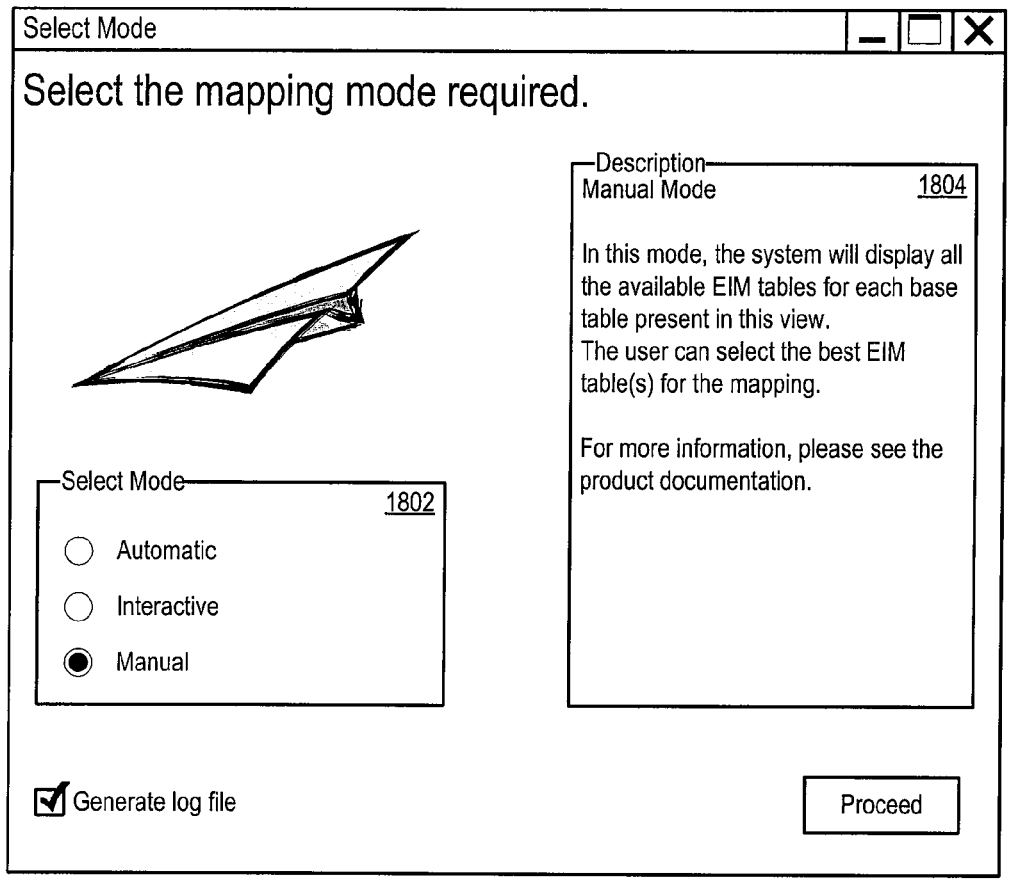
FIG. 20 shows a database mapping mode selection interface, in which the manual mapping mode is selected, that a data mapping tool generates to accept a mapping mode selection between multiple different mapping modes.

FIG. 20 shows a database mapping mode selection interface, in which the manual mapping mode is selected. In manual mapping mode, the system 300 searches for available intermediate staging tables, and allows the operator to select the intermediate staging tables to use in the data mapping document 440.

Figure 21:
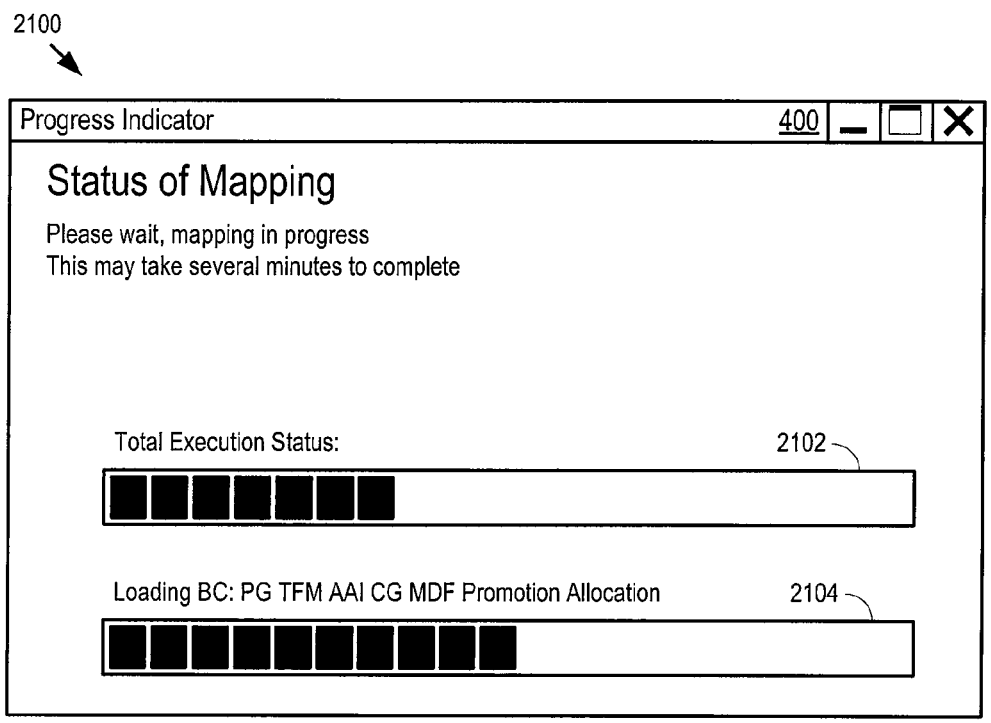
FIG. 21 shows a progress indicator interface that a data mapping tool generates to convey mapping progress to the database engineer.

FIG. 21 shows a progress indicator interface 2100 that the data mapping tool 336 generates to convey mapping progress to the database engineer. The progress indicator interface 2100 includes a total execution status indicator 2102, and a current task execution status indicator 2104. Additional, less, or different status information may be provided in the progress indicator interface 2100.

Figure 22:
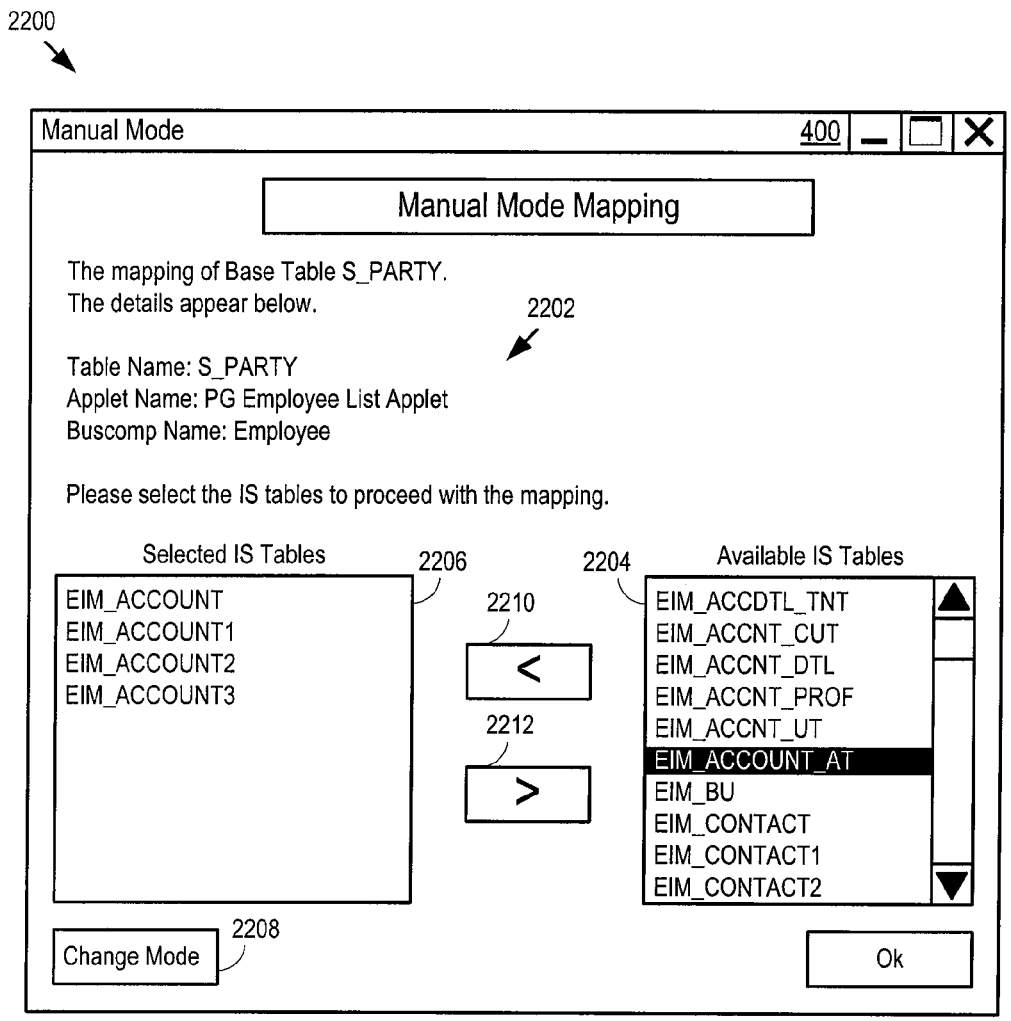
FIG. 22 shows an intermediate staging table selection interface a data mapping tool generates in a manual mapping mode to display an intermediate staging table selection and accept a selection of intermediate staging tables for mapping the target database columns.

FIG. 22 shows an intermediate staging table selection interface 2200 that the data mapping tool 336 generates. The data mapping tool 336 generates the intermediate staging table selection interface 2200 in manual mapping mode. The intermediate staging table selection interface 2200 includes a base table report display 2202, an intermediate staging table selector 2204, a selected table display 2206, and a Change Mode button 2208. The base table report display 2202 conveys to the database engineer the particular details of the current base table under consideration for mapping (e.g., S_PARTY), the component applet name, and the underlying business component name. The database engineer selects the intermediate staging tables desired for the mapping from the intermediate staging table selector 2204, and clicks on the Add button 2210 to add the selected table to the selected table display 2206. The database engineer may also choose a selected intermediate staging table shown in the selected table display 2206 and remove the selected table using the Remove button 2212. At any time, the database engineer may switch to a different mode by activating the Change Mode button 2208. In response, the data mapping tool 336 may return to the database mapping mode selection interface 1800.

Figure 23:
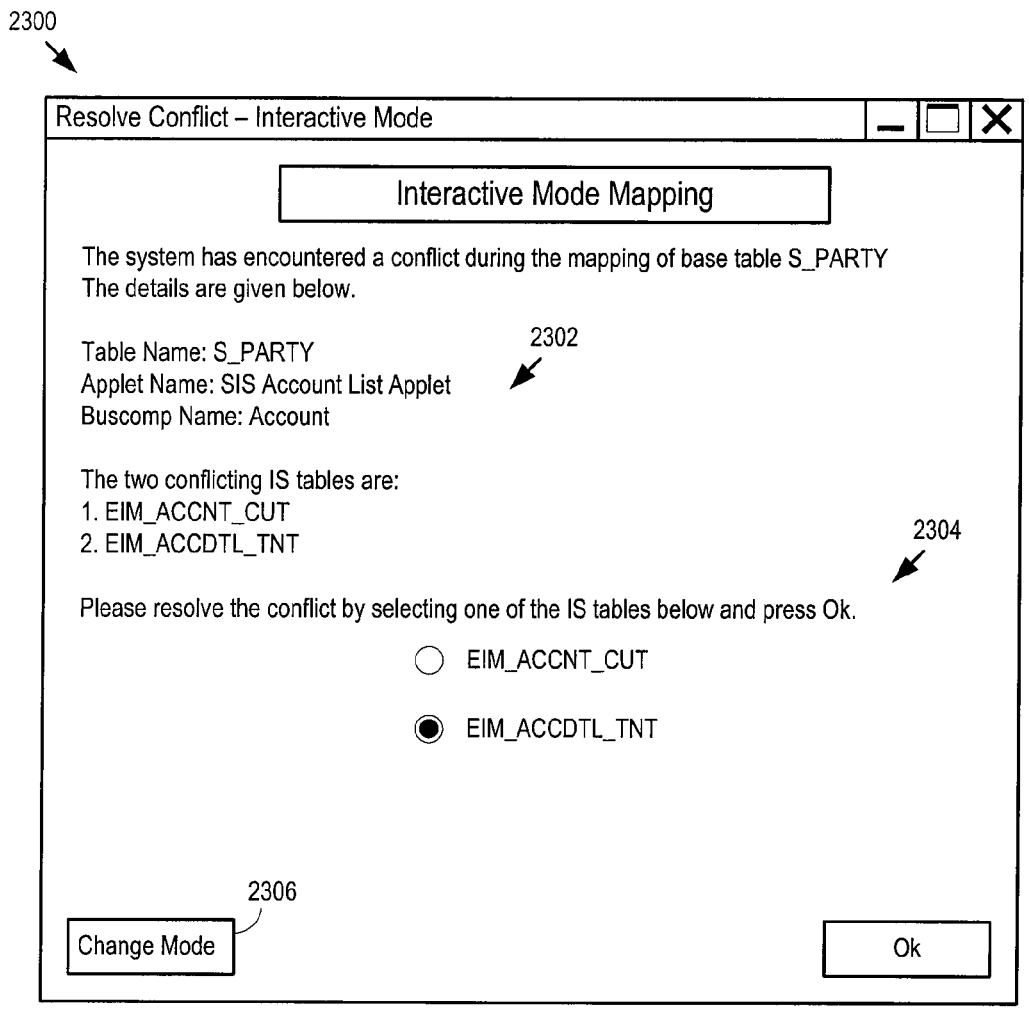
FIG. 23 shows a conflict resolution interface that a data mapping tool generates to obtain a conflict resolution input when the mapping mode is interactive.

FIG. 23 shows a conflict resolution interface 2300 that the data mapping tool 336 generates to obtain a conflict resolution input when the mapping mode is interactive. The conflict resolution interface 2300 includes a conflict detail display 2302, a conflict resolution display 2304, and a Change Mode button 2306. In the example shown in FIG. 23, the conflict detail display 2302 reports a conflict encountered when trying to map S_PARTY for the ISS Account List Applet, corresponding to the business component Account. The two conflicting intermediate staging tables are EIM_ACCNT_CUT and EIM_ACCDTL_TNT. The conflict resolution display 2304 provides radio button selectors through which the database engineer may choose between the conflicting intermediate staging tables. As noted above, the two intermediate staging tables may conflict when the system 300 determines that they have equal weight indicators.

Figure 24:
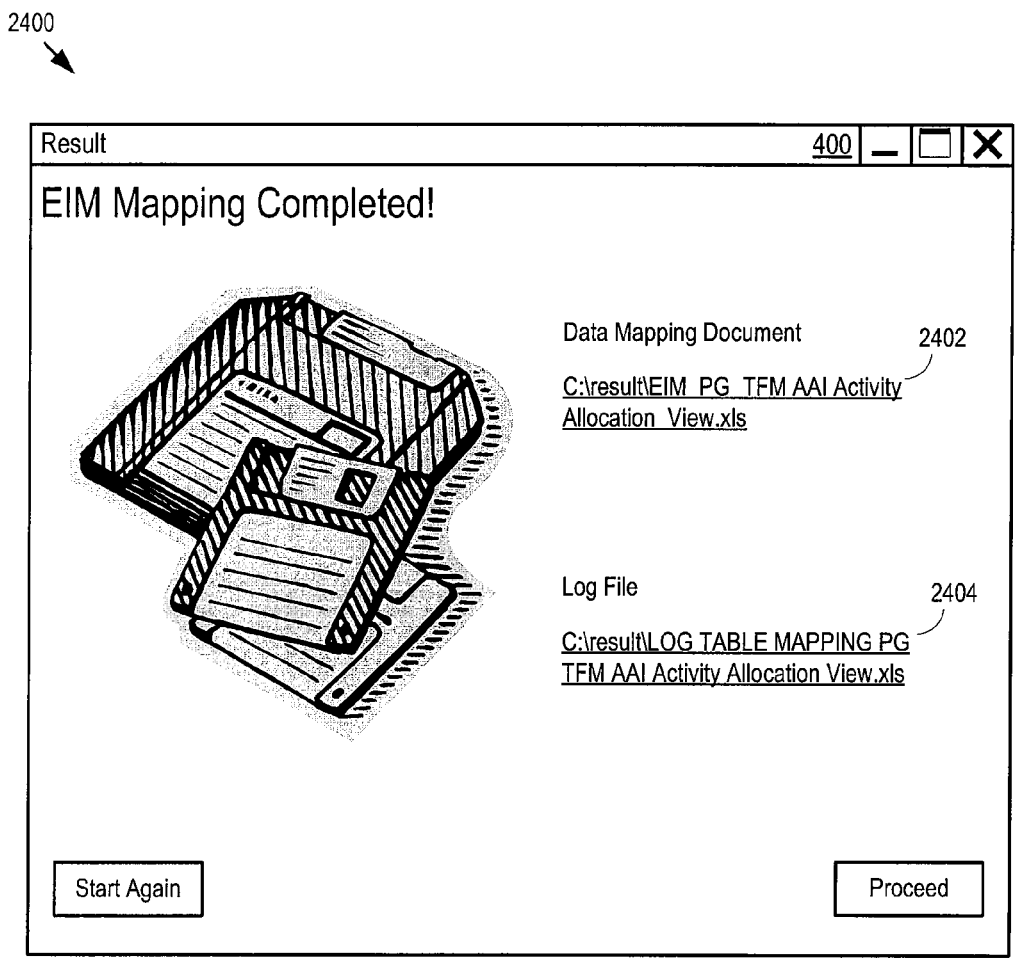
FIG. 24 shows a data mapping document completion interface that a data mapping tool generates to report creation of a data mapping document.

FIG. 24 shows a data mapping document completion interface 2400 that the data mapping tool 336 generates to report creation of a data mapping document and/or a log file. The data mapping document completion interface 2400 includes a data mapping document link 2402 and a log file link 2404. The links 2402 and 2404 specify where the data mapping document 440 and the log file have been written. The link 2402 and 2404 may include hyperlinks to the documents.

Figure 25:
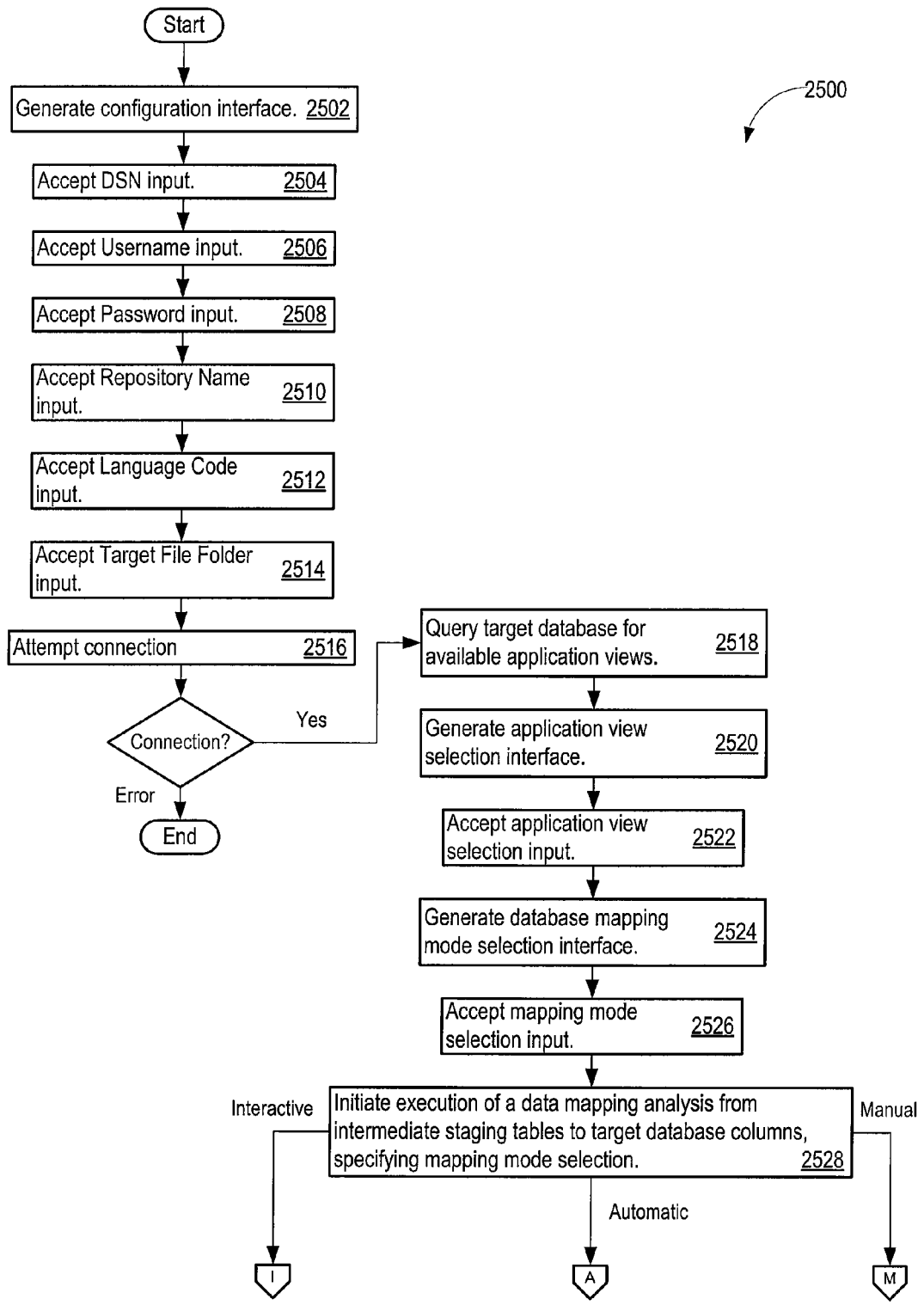
FIG. 25 shows processing flow for a data mapping tool.

FIG. 25 shows processing flow 2500 for the data mapping tool 336. The data mapping tool 336 generates the configuration interface 1600 (2502). The data mapping tool 336 accepts a data source name input (2054), a username input (2506), and a password input (2508). The data mapping tool 336 also accepts a repository name input 2510, a language code input 2512, and a target file folder input 2514.

With the configuration information, the data mapping tool 336 attempts a connection to the database repository 306. If the configuration parameters validate and a connection is established, the data mapping tool 336 continues by querying the database repository 306 for a list of available application views (2518). The data mapping tool 336 then generates the application view selection interface 1700 (2520) and obtains an application view selection input (2522). The data mapping tool 336 also generates the database mapping mode selection interface 1800 (2524). The database engineer provides a mapping mode selection input through the database mapping mode selection interface 1800 (2526).

Figure 26:
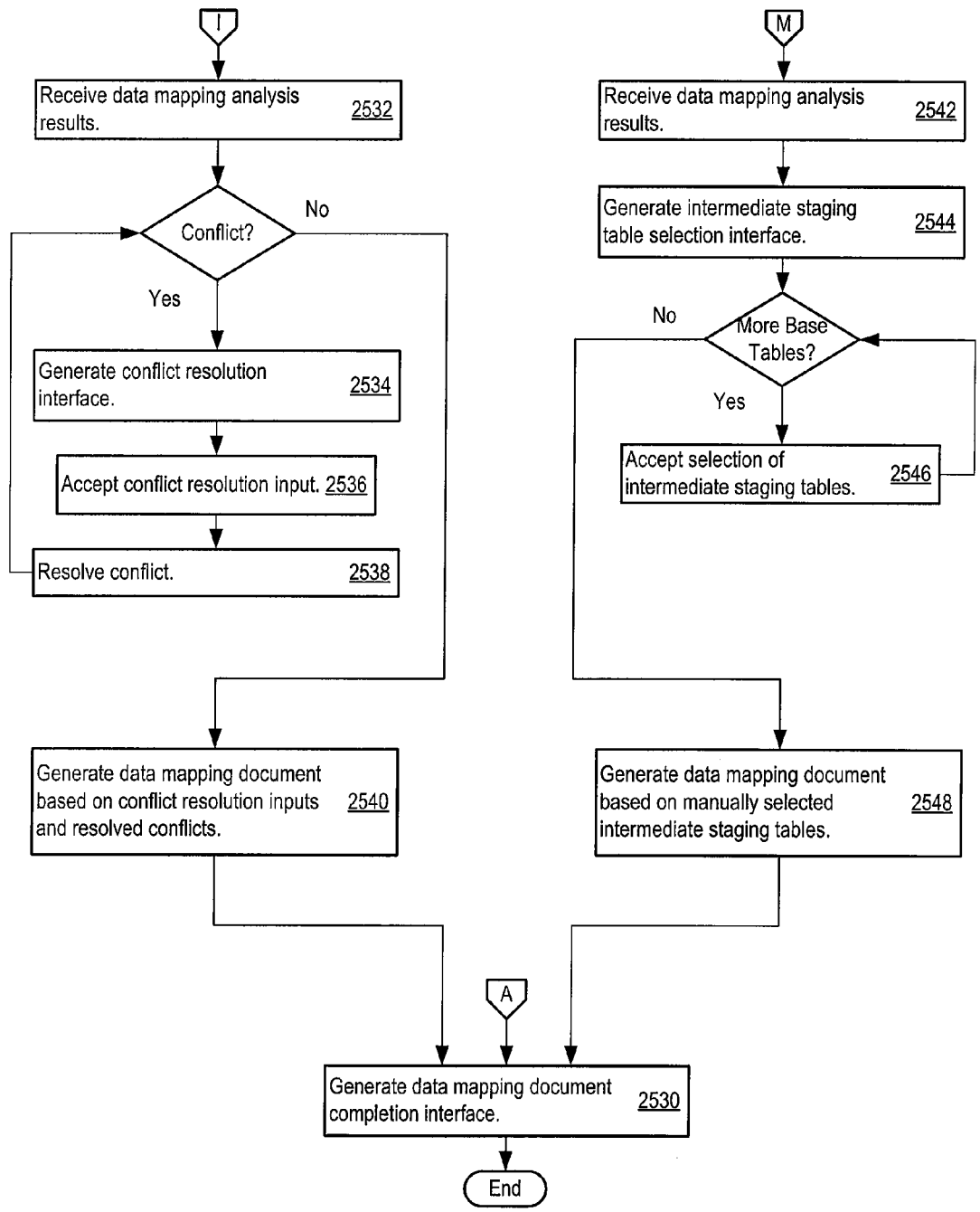
FIG. 26 shows additional processing flow for a data mapping tool.

The database mapping tool 336 Initiates execution of the data mapping analysis from intermediate staging tables to target database columns and specifies the mapping mode selection (2528). Turning to FIG. 26, when the mapping mode is automatic, the system 300 determines the mapping of intermediate staging tables and columns to target database tables and columns, and generates the data mapping document 440 automatically. The data mapping tool then generates the data mapping document completion interface 2400 (2530).

In interactive mode, the data mapping tool 336 receives the data mapping analysis result, including a list of conflicts between intermediate staging tables (2532). For each conflict, the data mapping tool 336 generates the conflict resolution interface 2300 (2534), accepts a conflict resolution input (2536), and resolves the conflict by using the intermediate staging table specified in the conflict resolution input (2538). With the conflict resolved, the data mapping tool 336 continues by generating the data mapping document 440 based on the resolved conflicts (2540) and generating the data mapping document completion interface 2400 (2530).

In manual mode, the data mapping tool 336 receives the data mapping analysis result, including a list of intermediate staging tables that are available to map to the target database table columns that support the selected application view (2542). The data mapping tool 336 generates the intermediate staging table selection interface 2200 (2544). The data mapping tool accepts manual selections of intermediate staging tables (2546) until each target database column has been mapped. In any mapping mode, fewer than all of the target database columns may be mapped, leading to a partial mapping stored in the data mapping document. Once the database engineer has finished selecting intermediate staging tables in manual mode, the data mapping tool 336 generates the data mapping document based on the manually selected intermediate staging tables (2548) and generating the data mapping document completion interface 2400 (2530).

A data mapping document design system provides technical solutions to the difficult technical problems associated with the costly, complex, and error prone endeavor of manually creating a data mapping document. The system not only achieves cost and time savings, but also achieves improvements in data quality, reduces occurrences of later discovered data errors, and provides technical innovations that may allow the system to more efficiently and correctly generate the data mapping document for a target database.

The data mapping tool facilitates database engineer interaction with the data mapping document design system. The data mapping tool guides the database engineer through the process of designing a data mapping document. The data mapping tool provides several data mapping mode options, and coordinates execution of the data mapping analysis for the database engineer.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for determining a data mapping to a target database, the method comprising:
    obtaining a view selection specifying an application view;
    determining component applets of the application view;
    determining target database columns in a target database that the component applets use to render the application view;
    determining a first set of intermediate staging tables that are available to import source database data into the target database columns;
    building a first intermediate mapping comprising target database column identifiers for the target database columns, intermediate staging table identifiers for the first set of intermediate staging tables, and mapping permissibility indicators between the first set of intermediate staging tables and the target database columns;
    executing a search algorithm on the intermediate mapping to determine a first intermediate staging table selection for mapping the source database data to the target database columns in the target database through the first set of intermediate staging tables, where executing the search algorithm comprises:
        executing a weighted selection based on the mapping permissibility indicators in the intermediate mapping, and
        persistently executing the weighted selection to obtain the first intermediate staging table selection; and
    creating a data mapping document specifying the first intermediate staging table selection for mapping the source database data to the target database columns.

2. The method of claim 1, further comprising:
    determining that the first intermediate mapping does not cover all of the target database columns; and where:
    the first intermediate staging table selection comprises a partial mapping of the source database data to the target database columns through the first set of intermediate staging tables.

3. The method of claim 1, where determining intermediate staging tables comprises:
    searching a metadata repository for the target database to identify the first set of intermediate staging tables.

4. The method of claim 1, further comprising:
    for intermediate staging tables identified in the first intermediate staging table selection, mapping intermediate staging table columns in the intermediate staging tables to the target database columns in the target database; and
    where creating a data mapping document comprises:
    specifying the intermediate staging table columns and the target database columns in the data mapping document.

5. The method of claim 1, further comprising:
    determining a join table comprising join table columns that the component applets use to implement the application view.

6. The method of claim 5, further comprising:
    determining a second set of intermediate staging tables that are available to import source database data into the join table columns;
    building a join table intermediate mapping comprising join table column identifiers for the join table columns, intermediate staging table identifiers for the second set of intermediate staging tables, and mapping permissibility indicators between the second set of intermediate staging tables and the join table columns;
    executing the search algorithm on the join table intermediate mapping to determine a second intermediate staging table selection for mapping the source database data to the join table columns through the second set of intermediate staging tables; and
    creating the data mapping document using the second intermediate staging table selection and the first intermediate staging table selection.

7. The method of claim 1, further comprising:
    determining a multi-value field that the component applets use to render the application view.

8. The method of claim 7, further comprising:
    determining a relation field in a base table operable to specify a multi-value table that provides values for the multi-value field; and
    in the data mapping document, mapping the base table to a multi-value intermediate staging table for the multi-value table.

9. The method of claim 1, where determining target data base columns comprises:
    analyzing a business logic layer between the component applets and the target data base.

10. The method of claim 1, further comprising:
    determining an applet relation between a first component applet and a second component applet among the component applets; and
    in the data mapping document, inserting an applet relation specification specifying an applet relation intermediate staging table identified for the applet relation.

11. A product comprising:
    a machine-readable medium; and
    logic stored in the medium and operable to cause a processor to perform a data mapping analysis, the logic comprising:
        view analysis logic operable to determine component applets of an application view;
        applet analysis logic operable to determine target database columns that the component applets use to render the application view;
        staging table analysis logic operable to determine a first set of intermediate staging tables that are available to import source database data into the target database columns;
        intermediate mapping logic operable to build a first intermediate mapping comprising target database column identifiers for the target database columns, intermediate staging table identifiers for the first set of intermediate staging tables, and mapping permissibility indicators between the first set of intermediate staging tables and the target database columns;

search logic operable to search the first intermediate mapping to determine a first intermediate staging table selection for mapping the source database data to the target database columns in the target database through the first set of intermediate staging tables, where searching the first intermediate mapping comprises:

executing a weighted selection based on the mapping permissibility indicators in the first intermediate mapping, and persistently executing the weighted selection to obtain the first intermediate staging table selection; and file creation logic operable to create a data mapping document specifying the first intermediate staging table selection for mapping the source database data to the target database columns.

12. The product of claim 11, where the weighted selection logic is operable to determine a weight indicator for each of the intermediate staging tables based on the mapping permissibility indicators.

13. The product of claim 11, where the persistent execution logic is operable to iteratively apply the weighted selection logic to obtain the first intermediate staging table selection.

14. The product of claim 11, where the first intermediate staging table selection maps fewer than all of the target database columns.

15. The product of claim 11, where the applet analysis logic comprises:

metadata repository search logic.

16. The product of claim 11, further comprising:

mapping logic operable to map intermediate staging table columns in the intermediate staging tables in the first intermediate staging table selection to the target database columns in the target database.

17. The product of claim 11, where:

the staging table analysis logic is further operable to determine a second set of intermediate staging tables that are available to import source database data into join table columns that the component applets use to render the application view;

the intermediate mapping logic is further operable to build a joint table intermediate mapping comprising join table column identifiers for the join table columns, intermediate staging table identifiers for the second set of intermediate staging tables, and mapping permissibility indicators between the second set of intermediate staging tables and the join table columns;

the search logic is further operable to search the join table intermediate mapping to determine a second intermediate staging table selection for mapping the source database data to the join table columns through the second set of intermediate staging tables; and the file creation logic is further operable to create the data mapping document using the second intermediate staging table selection and the first intermediate staging table selection.

18. The product of claim 11, where:

the staging table analysis logic is further operable to:

determine a multi-value field that the component applets use to render the application view; and determine a relation field in a base table operable to specify a multi-value table that provides values for the multi-value field; and where:

the file creation logic is further operable to establish, in the data mapping document, a mapping of the base table to a multi-value intermediate staging table for the multi-value table.

19. A product comprising:

a machine readable medium; and logic stored in the medium and operable to cause a processor to perform a data mapping analysis to target database columns, the logic comprising:

intermediate mapping logic operable to build a first intermediate mapping comprising target database column identifiers for the target database columns, intermediate staging table identifiers for a first set of intermediate staging tables, and mapping permissibility indicators between the first set of intermediate staging tables and the target database columns;

search logic operable to search the first intermediate mapping to determine a first intermediate staging table selection for mapping source database data to the target database columns through the first set of intermediate staging tables, where searching the first intermediate mapping comprises:

executing a weighted selection based on the mapping permissibility indicators in the first intermediate mapping, and persistently executing the weighted selection to obtain the first intermediate staging table selection; and file creation logic operable to create a data mapping document specifying the first intermediate staging table selection for mapping the source database data to the target database columns.

20. The product of claim 19, where the logic stored on the machine readable medium further comprises:

view analysis logic operable to determine component applets of an application view that use the target database columns.

21. The product of claim 20, where the logic stored on the machine readable medium further comprises:

view selection logic operable to obtain a view selection of the application view.

22. The product of claim 19, where the logic stored on the machine readable medium further comprises:

staging table analysis logic operable to determine a first set of intermediate staging tables that are available to import source database data into the target database columns.

23. The product of claim 19, where the logic stored on the machine readable medium further comprises:

mapping logic operable to map intermediate staging table columns in the intermediate staging tables in the first intermediate staging table selection to the target database columns in the target database.

* * * * *

UNITED STATES PATENT AND TRADEMARK OFFICE
CERTIFICATE OF CORRECTION

| | | |
|---|---|---|
| PATENT NO. | : 7,801,884 B2 | Page 1 of 1 |
| APPLICATION NO. | : 11/967455 | |
| DATED | : September 21, 2010 | |
| INVENTOR(S) | : Alex George Zachariah | |

It is certified that error appears in the above-identified patent and that said Letters Patent is hereby corrected as shown below:

In column 21, line 46, in claim 17, delete "joint" and insert -- join --, therefor.

Signed and Sealed this

Seventh Day of December, 2010

David J. Kappos
*Director of the United States Patent and Trademark Office*